US012561561B2

(12) United States Patent
Zheng et al.

(10) Patent No.: US 12,561,561 B2
(45) Date of Patent: Feb. 24, 2026

(54) MAPPING USER VECTORS BETWEEN EMBEDDINGS FOR A MACHINE LEARNING MODEL FOR AUTHORIZING ACCESS TO RESOURCE

(71) Applicant: Visa International Service Association, San Francisco, CA (US)

(72) Inventors: Yan Zheng, Sunnyvale, CA (US); Haoyu Zhang, Foster City, CA (US); Wei Zhang, Foster City, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 1018 days.

(21) Appl. No.: 17/642,914

(22) PCT Filed: Sep. 27, 2019

(86) PCT No.: PCT/US2019/053580
§ 371 (c)(1),
(2) Date: Mar. 14, 2022

(87) PCT Pub. No.: WO2021/061159
PCT Pub. Date: Apr. 1, 2021

(65) Prior Publication Data
US 2022/0405580 A1 Dec. 22, 2022

(51) Int. Cl.
*H04M 1/72448* (2021.01)
*G06F 18/2137* (2023.01)
(Continued)

(52) U.S. Cl.
CPC .......... *G06N 3/08* (2013.01); *G06F 18/2137* (2023.01); *G06F 18/22* (2023.01); *G06F 18/24147* (2023.01); *G06N 3/045* (2023.01)

(58) Field of Classification Search
CPC .......... G06N 3/08; G06N 3/045; G06N 3/044; G06N 3/048; G06F 18/2137; G06F 18/22; G06F 18/24147
See application file for complete search history.

(56) References Cited

U.S. PATENT DOCUMENTS

| | | | |
|---|---|---|---|
| 2010/0125605 A1 | 5/2010 | Nair et al. | |
| 2015/0227935 A1 | 8/2015 | Adjaoute | |
| (Continued) | | | |

FOREIGN PATENT DOCUMENTS

| | | |
|---|---|---|
| CN | 105431839 A | 3/2016 |
| CN | 110036386 A | 7/2019 |
| (Continued) | | |

OTHER PUBLICATIONS

Chen et al., "Learning K-way D-dimensional Discrete Codes for Compact Embedding Representations", Available online at: https://arxiv.org/pdf/1806.09464.pdf, Jun. 21, 2018, 12 pages.
(Continued)

*Primary Examiner* — KC Chen
(74) *Attorney, Agent, or Firm* — Kilpatrick Townsend & Stockton LLP

(57) ABSTRACT

A method and system for determining an access score is disclosed. The method includes receiving an access request to access a resource by a user device. Next, a user embedding is retrieved from an embedding table, the user embedding associated with a user identifier of the user device and providing a multidimensional data point that represents a context of a user identifier. The context may correspond to the user identifier appearing in previous access requests within temporal proximity to other access requests from a subset of other user devices among a plurality of user devices. The method then inputs the user embedding into a first machine learning model that is trained based at least in part on the embedding table. The first machine learning
(Continued)

300 model subsequently outputs an access score that corresponds to a level of authenticity of authorizing the user device to access the resource.

19 Claims, 12 Drawing Sheets

(51) Int. Cl.

| | |
|---|---|
| *G06F 18/22* | (2023.01) |
| *G06F 18/2413* | (2023.01) |
| *G06N 3/045* | (2023.01) |
| *G06N 3/08* | (2023.01) |
| *H04M 1/72469* | (2021.01) |

(56) References Cited

U.S. PATENT DOCUMENTS

| | | | |
|---|---|---|---|
| 2017/0372318 A1 | 12/2017 | Shami et al. | |
| 2018/0197108 A1 | 7/2018 | Fang et al. | |
| 2019/0258818 A1 | 8/2019 | Yu et al. | |
| 2020/0364366 A1* | 11/2020 | Kundu | H04L 63/102 |

FOREIGN PATENT DOCUMENTS

| | | |
|---|---|---|
| EP | 4068165 A1 | 10/2022 |
| KR | 20180120240 | 11/2018 |

OTHER PUBLICATIONS

Application No. PCT/US2019/053580 , International Search Report and Written Opinion, Mailed on Jun. 25, 2020, 11 pages.

Application No. CN201980100671.6, Office Action, Mailed Mar. 20, 2025, 12 pages with translation.

Application No. SG11202202182W , Written Opinion, Mailed on Feb. 20, 2025, 9 pages.

Application No. CN201980100671.6 , Office Action, Mailed on Jul. 22, 2025, 12 pages, with English Language Summary.

* cited by examiner

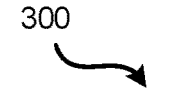
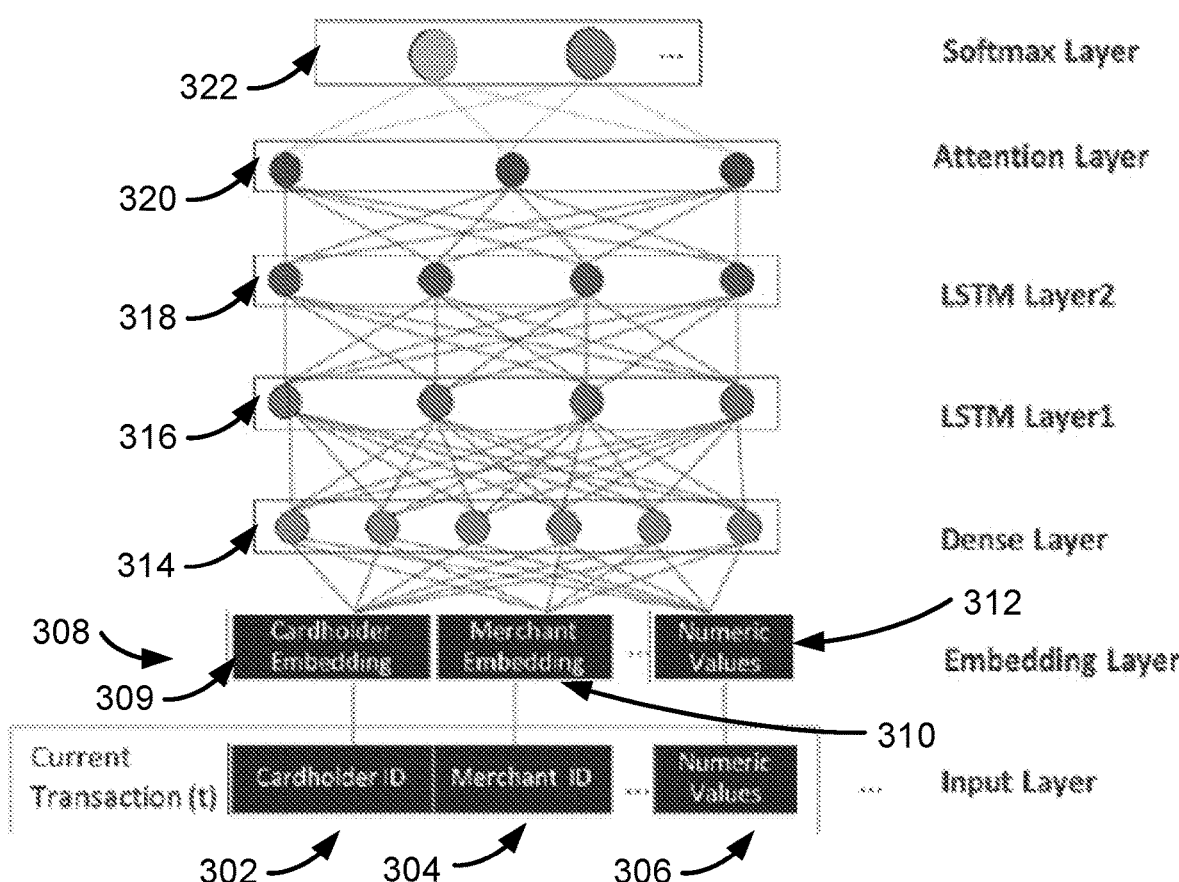
FIG. 3

|  | DIM_1 | DIM_2 | DIM_3 | ... | DIM_N |
|---|---|---|---|---|---|
| ID_1 | 0.301753 | 0.64881 | 0.453077 | 0.454081 | 0.707187 |
| ID_2 | 0.310021 | 0.523144 | 0.421011 | 0.765014 | 0.810093 |
| ID_3 | -0.23261 | -0.96833 | 0.566046 | 0.253072 | -0.6577 |
| ... | 0.548972 | 0.361651 | 0.747749 | -0.35786 | 0.639163 |
| ID_M | 0.757281 | 0.972477 | 0.582329 | -0.66995 | 0.369574 |

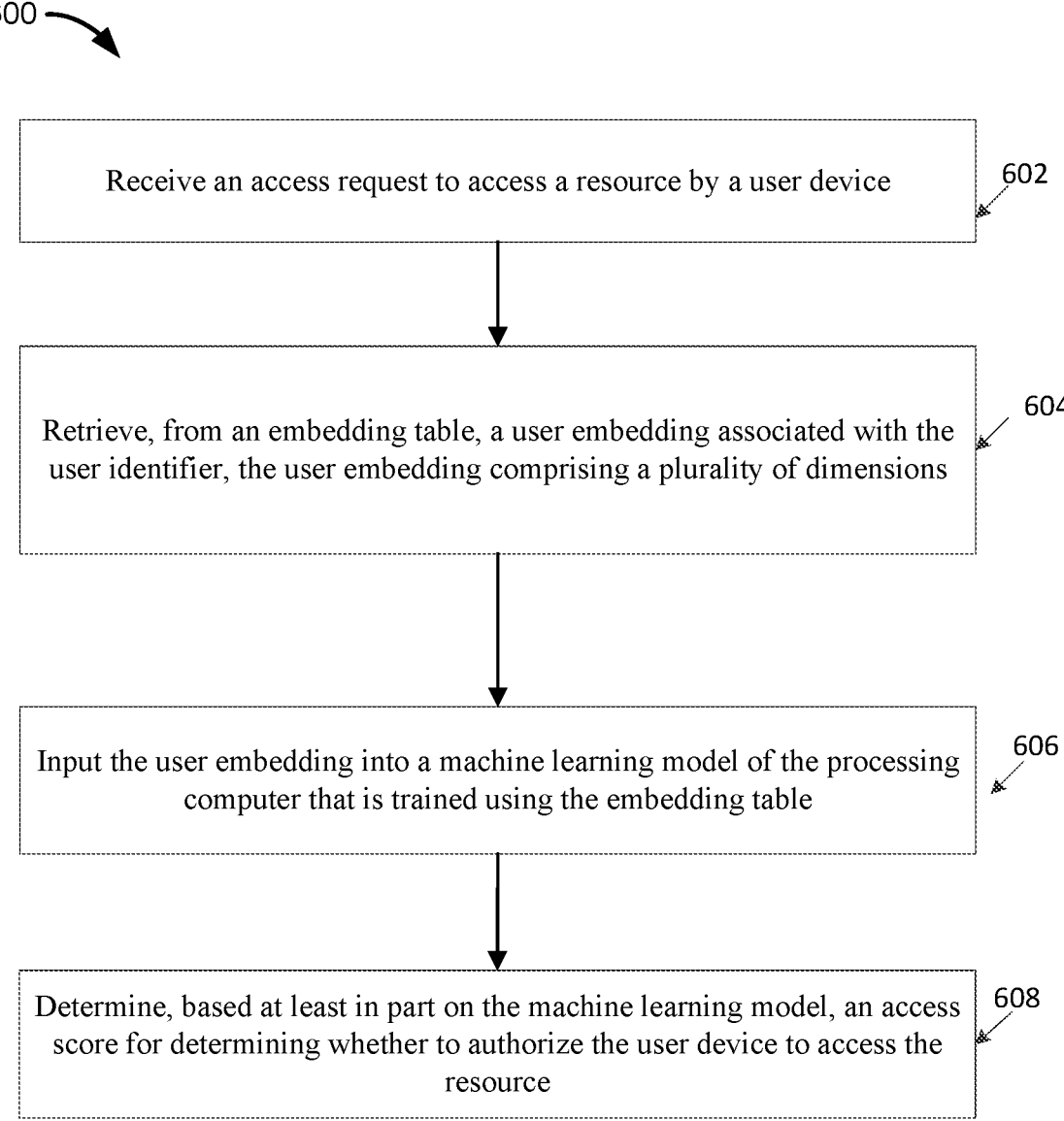

600

Receive an access request to access a resource by a user device ⟍602

Retrieve, from an embedding table, a user embedding associated with the user identifier, the user embedding comprising a plurality of dimensions ⟋604

Input the user embedding into a machine learning model of the processing computer that is trained using the embedding table ⟋606

Determine, based at least in part on the machine learning model, an access score for determining whether to authorize the user device to access the resource ⟋608

FIG. 6

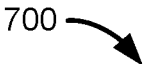
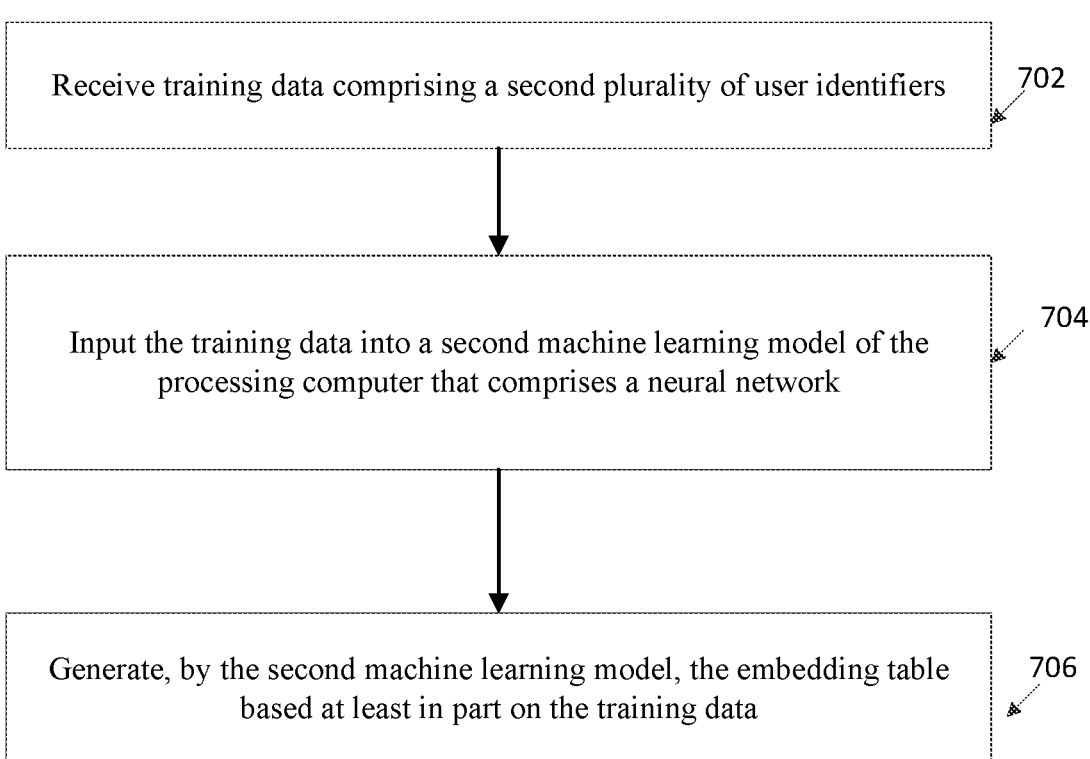
Receive training data comprising a second plurality of user identifiers    702
Input the training data into a second machine learning model of the processing computer that comprises a neural network    704
Generate, by the second machine learning model, the embedding table based at least in part on the training data    706
FIG. 7

900

1000

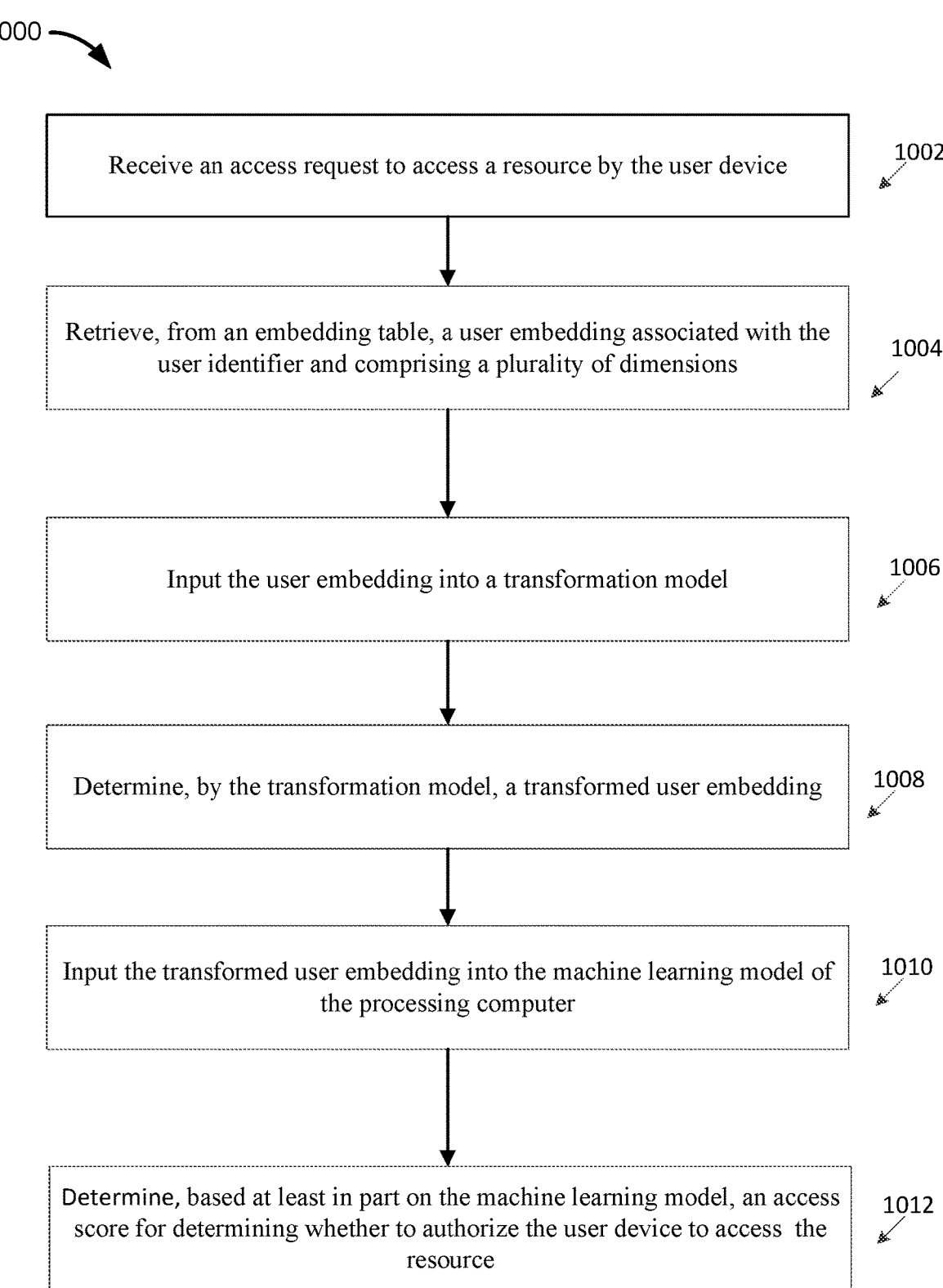

Receive an access request to access a resource by the user device          1002

Retrieve, from an embedding table, a user embedding associated with the user identifier and comprising a plurality of dimensions          1004

Input the user embedding into a transformation model          1006

Determine, by the transformation model, a transformed user embedding          1008

Input the transformed user embedding into the machine learning model of the processing computer          1010

Determine, based at least in part on the machine learning model, an access score for determining whether to authorize the user device to access the resource          1012

Subsequent to generating an embedding table, generate a second embedding table — 1102

Generate a transformation model based at least in part on the embedding table and the second embedding table — 1104

Evaluate the transformation model based at least in part on utilizing a nearest-neighbor algorithm — 1106

1200

MAPPING USER VECTORS BETWEEN EMBEDDINGS FOR A MACHINE LEARNING MODEL FOR AUTHORIZING ACCESS TO RESOURCE

CROSS-REFERENCE TO RELATED APPLICATIONS

This is a 371 Application of International Application PCT/US2019/053580, filed on Sep. 27, 2019, the disclosure of which is herein incorporated by reference in its entirety for all purposes.

BACKGROUND

Entities exist that process access requests for access to a resource and may determine a confidence level (e.g., risk of fraud) for a particular access request. In one example, an authorizing entity may issue a user device (e.g., an access card) to an authorized user, which allows the user to utilize credentials (e.g., account number, etc.) associated with the account to access the resource. An intermediary entity (e.g., a processing network) may utilize a prediction model to determine an access score for a particular access request on behalf of the authorizing entity and transmit that score to the authorizing entity for use in determining whether to approve the request.

Current prediction models are not entirely accurate in generating an access score, and sometimes result in recommending (or approving) fraudulent requests (or vice versa). These prediction models are especially problematic when an authorized user's pattern of behavior has changed. For example, the authorized user may have moved from one city to another, and accordingly now obtains resources from different resource providers than in the past. Unless a prediction model can incorporate new contexts in which an authorized user behaves, the prediction model's accuracy may be degraded.

Accordingly, there is a need for a mechanism that more accurately incorporates an authorized user's context—as well as updates to the authorized user's context—for use by a machine learning model in determining whether to grant access to a particular access request.

Embodiments of the disclosure address these and other problems, individually and collectively.

BRIEF SUMMARY

Embodiments of the disclosure provide systems, methods, and apparatuses for managing access to a protected resource. The access can be managed by generating an access score that is based at least in part on a context for a user identifier associated with a user device of an authorized user. A processing computer may receive an access request to access a protected resource by the user device (e.g., access card, mobile phone, etc.). The access request may include the user identifier for the user device (e.g., an account number, etc.) as well as a resource provider identifier corresponding to the resource provider. The processing computer may utilize the user identifier to retrieve a user embedding from an embedding table, whereby the user embedding indicates a similarity of the user device to other user devices within a contextual space. For example, a user embedding may encapsulate information indicating whether the user device has been used to access resources from similar types of resource providers as other user devices. The processing computer may then input the user embedding into a machine learning model (e.g., a prediction model), which in turn generates an access score for the user device that corresponds to a level of risk of authorizing the user device to access the resource.

According to one embodiment of the disclosure, an access request to access a resource by a user device may be received by a processing computer, whereby the access request includes a resource provider identifier and a user identifier of a plurality of user identifiers respectively associated with a plurality of user devices. The processing computer may retrieve a user embedding from an embedding table, whereby the user embedding is associated with the user identifier and comprises a plurality of dimensions. Each dimension of the plurality of dimensions may be associated with a context of the user identifier appearing in previous access requests within temporal proximity to other access requests from a subset of other user devices among the plurality of user devices. In this way, the user embedding may provide a multidimensional data point indicating a similarity of the user device to the subset of other user devices. The processing computer may then input the user embedding into a first machine learning model (e.g., a neural network) of the processing computer that is trained using the embedding table. The first machine learning model may then determine an access score for determining whether to authorize the user device to access the resource. The access score may correspond to a level of authenticity of authorizing the user device to access the resource.

According to another embodiment of the disclosure, subsequent to generating the user embedding described above, the processing computer may receiving a second access request to access a second resource by the user device. The second access request may include a second resource provider identifier and the user identifier of the plurality of user identifiers respectively associated with the plurality of user devices. The processing computer may then retrieve a second user embedding from a second embedding table. The second user embedding may comprise a second plurality of dimensions. Each dimension of the second plurality of dimensions may be associated with a second context of the user identifier appearing in previous access requests within temporal proximity to other access requests from a second subset of other user devices among the plurality of user devices. In this way, the second user embedding may provide a second multidimensional data point indicating a second similarity of the user device to the second subset of other user devices. The processing computer may then input the second user embedding into a transformation model of the processing computer that is trained based at least in part on the second embedding table and the embedding table. The transformation model may then determine a transformed user embedding. The processing computer may then input the transformed user embedding into the machine learning model of the processing computer. The machine learning model may then determine a second access score for determining whether to authorize the user device to access the second resource.

Other embodiments are directed to systems, portable consumer devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 3 depicts a prediction model of a processing computer used for generating an access score by utilizing an embedding, according to an embodiment of the invention.

FIG. 6 depicts a flowchart for generating an access score by a prediction model, according to an embodiment of the invention.

FIG. 7 depicts a flowchart for generating an embedding table, according to an embodiment of the invention.

FIG. 10 depicts a flowchart for generating an access score by a previously trained prediction model using a transformation model, according to an embodiment of the invention.

TERMS

Figure 1:
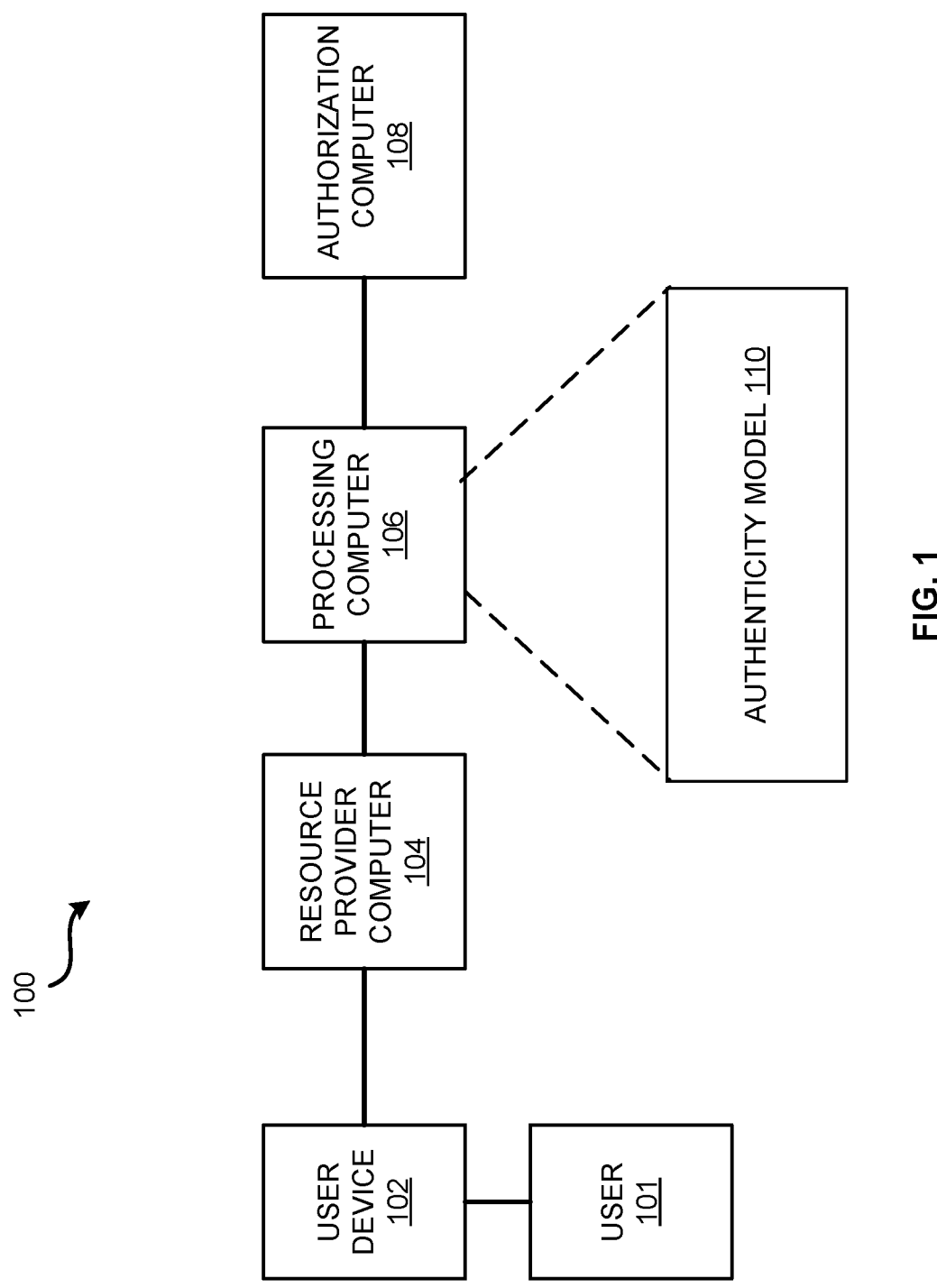
FIG. 1 depicts a block diagram of a system for generating an access score for authorizing a resource, according to an embodiment of the invention.

Prior to discussing embodiments of the invention, description of some terms may be helpful in understanding embodiments of the invention.

A "user device" can include a device that is used by a user to obtain access to a resource. The user device may be a software object, a hardware object, or a physical object. As examples of physical objects, the user device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device (e.g., an identifier for a payment account). In a payment example, a user device may be a payment card (e.g., debit card, credit card). Other examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G, or similar networks), Wi-Fi, Wi-Max, or any other communication medium that may provide access to a network such as the Internet or a private network.

A "user" may include an individual. In some embodiments, a user may be associated with one or more personal accounts and/or user devices. The user may also be referred to as a cardholder, account holder, or consumer in some embodiments.

An "application" may be a computer program that is used for a specific purpose. Examples of applications may include a banking application, digital wallet application, cloud services application, ticketing application, etc.

A "user identifier" may include any characters, numerals, or other identifiers associated with a user device of a user. For example, a user identifier may be a personal account number (PAN) that is issued to a user by an issuer (e.g., a bank) and printed on the user device (e.g., payment card) of the user. Other non-limiting examples of user identifiers may include a user email address, user ID, or any other suitable user identifying information. The user identifier may also be identifier for an account that is a substitute for an account identifier. For example, the user identifier could include a hash of a PAN. In another example, the user identifier may be a token such as a payment token.

A "resource provider" may include an entity that can provide a resource such as goods, services, information, and/or access. Examples of resource providers includes merchants, data providers, transit agencies, governmental entities, venue and dwelling operators, etc. A "merchant" may include an entity that engages in transactions. A merchant can sell goods and/or services or provide access to goods and/or services.

A "resource" generally refers to any asset that may be used or consumed. For example, the resource may be an electronic resource (e.g., stored data, received data, a computer account, a network-based account, an email inbox), a physical resource (e.g., a tangible object, a building, a safe, or a physical location), or other electronic communications between computers (e.g., a communication signal corresponding to an account for performing a transaction).

An "access request" (also referred to as an "authorization request") generally refers to a request to access a resource. The access request may be received from a requesting computer, a user device, or a resource computer, for example. The access request may include authentication information (also referred to as authorization information), such as a user name, resource identifier, or password. The access request may also include and access request parameters, such as an access request identifier, a resource identifier, a timestamp, a date, a device or computer identifier, a geo-location, or any other suitable information.

An "authorization response message" may include a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., point-of-sale (POS) equipment) that indicates approval of the transaction. The code may serve as proof of authorization.

An "authorizing entity" may include an entity that authorizes a request. Examples of an authorizing entity may be an issuer, a governmental agency, a document repository, an access administrator, etc. An authorizing entity may operate an authorizing entity computer. An "issuer" may typically refer to a business entity (e.g., a bank, cloud services provider) that maintains an account for a user. An issuer may also issue credentials (e.g., payment credentials) stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), server computers, tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

A "machine learning model" may refer to any suitable computer-implemented technique for performing a specific task that relies on patterns and inferences. A machine learning model may be generated based at least in part on sample data ("training data") that is used to determine patterns and inferences, upon which the model can then be used to make predictions or decisions based at least in part on new data. Some non-limiting examples of machine learning algorithms used to generate a machine learning model include supervised learning and unsupervised learning. Non-limiting examples of machine learning models include artificial neural networks, decision trees, Bayesian networks, natural language processing (NLP) models, etc.

An "embedding" may be a multi-dimensional representation (e.g., mapping) of an input (which also may be known as a "word") to a position (e.g., a "context") within a multi-dimensional contextual space. The input may be a discrete variable (e.g., a user identifier, a resource provider identifier), and the discrete variable may be projected (or "mapped") to a vector of real numbers. In some cases, each real number of the vector may range from −1 to 1. In some cases, a neural network may be trained to generate an embedding. The dimensional space of the embedding may collectively represent a context of the input within a vocabulary of other inputs. For example, in an NLP example, an input may correspond to a word in the English language, and a word embedding may capture word semantics in the context of a sentence such that the word embedding may represent differently within different sentence contexts, even though it is the same word. In a transaction example, the input may correspond to a user identifier, and a user embedding may represent the context of the user identifier appearing in previous access requests within temporal proximity to other access requests from other user identifiers. An embedding may be used to determine a similarity of a particular input with another input. For example, a user embedding vector may be compared to another user embedding vector to determine a similarity between the user identifiers. A resource provider embedding vector may be compared to another resource provider embedding vector to determine a similarity the resource providers.

An "embedding table" may be a table of embeddings. In some cases, each column of the embedding table may represent a dimension of an embedding, and each row may represent a different embedding vector. Also, in some cases, an embedding table may be generated during the training of a neural network.

A "transformation model" may include an algorithm that maps a first set of embedding vectors in a source space to a second set of embedding vectors in a target space. In some cases, the first set may be created prior to the second set of embeddings, and the second set of embeddings may include the same inputs as the first set. However, the dimensions of each set may respectively correspond to difference spaces. The transformation model may include a neural network that is trained by receiving the first set of embeddings and the second set of embeddings and determining a mapping for a matching embedding (e.g., matching user identifiers) in each set. The trained transformation model may receive as input an embedding that was generated under the dimensional space of the second set of embeddings and output a transformed embedding that corresponds to the dimensional space of the first set of embeddings. The mapping producing the transformed embedding may be bi-directional.

An "access score" may include any characters, numerals, or other identifier that indicates a level of risk associated with an identifier (e.g., a user identifier). For example, an access score may be a probability value between 0 and 1, which may correspond to a level of risk (e.g., risk of fraud) in authorizing a user and/or user device to access a resource. For example, a score of 0.95 may indicate a high probability that this is a fraudulent access request. In another example, an access score may comprise multiple elements. For example, in the case of payment transactions, the access score may indicate a frequency of charge backs associated with the user identifier, frequency of activity in multiple zip codes, etc.).

A "processor" may include a device that processes something. In some embodiments, a process can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may include any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

The term "server computer" may include a powerful computer or cluster of computers. For example, the server computer can be a large mainframe, a minicomputer cluster, or a group of computers functioning as a unit. In one example, the server computer may be a database server coupled to a web server. The server computer may be coupled to a database and may include any hardware, software, other logic, or combination of the preceding for servicing the requests from one or more other computers. The term "computer system" may generally refer to a system including one or more server computers coupled to one or more databases.

As used herein, the term "providing" may include sending, transmitting, making available on a web page, for downloading, through an application, displaying or rendering, or any other suitable method.

Details of some embodiments of the present disclosure will now be described in greater detail.

DETAILED DESCRIPTION

As part of determining whether to grant access to a resource, a machine learning model (e.g., a prediction model) can generate an access score (e.g., relating to a confidence that the request is authentic) for a user identifier based at least in part on a user embedding that is associated with the user identifier of a user. The user embedding may be used to represent the user's behavior within a context of other users' behaviors, and therefore may be used to indicate a similarity of one user behavior to another user behavior. The prediction model may be trained to generate the access score based at least in part on this contextual information.

A previously trained prediction model may determine an updated access score based at least in part on receiving as input a transformed embedding generated by a transformation model. Such use of a transformed embedding can take into account that user behavior is continually changing (e.g., new shopping patterns), and thus an embedding for a user identifier may be updated on a periodic basis. However, the prediction model may not be updated as frequently. Accordingly, a system can utilize a transformation model to generate a transformed embedding based at least in part on an updated embedding. The previously trained prediction model may then utilize the transformed embedding to generate an updated access score that takes into account more recent changes in the user's behavioral context.

In one illustrative example, consider a scenario in which a user utilizes a user device (e.g., payment card) to request authorization from an issuer (e.g., bank) to obtain access to funds to purchase merchandise from a resource provider (e.g., a merchant). A processing computer may act as an intermediary for the issuer and determine an access score that is then transmitted to an authorization computer of the issuer for authorization. The processing computer may train a risk prediction model based at least in part on an embedding table of embeddings (e.g., vectors), which itself was generated by a machine learning model (e.g., a neural network) of the processing computer. Each vector value of an embedding may correspond to a dimension of a contextual space. In this way, a similarity between embeddings may be determined based at least in part on comparing the respective values of each embedding vector.

The vectors of the embedding table, along with a set of training labels (e.g., ground truth information indicating whether a particular transaction was approved, denied, determined to be fraudulent, etc.), may be input to train the risk prediction model. Specifically, in the case where the risk prediction model includes a neural network, the weights of nodes of the neural network may be determined based at least in part on the vector values of the embedding table. In this example, the user identifier (e.g., PAN) may be associated with payment transactions involving similar merchants as other user identifiers, e.g., because the users live in the same city and have similar shopping preferences. Accordingly, the user embedding for this user identifier may be similar to other user embeddings for other user identifiers (e.g., a high cosine similarity between vectors). However, in this particular transaction, the merchant may be atypical and not associated with other user identifiers with similar embeddings. The trained risk prediction model may use contextual information from the embedding to determine a higher level of risk (e.g., a higher access score) in authorizing the transaction.

In another illustrative example, consider a scenario in which the user described above has moved to a new city. In this example, the user's behavior may be substantially changed. For example, the user may shop at different merchants and/or different types of merchants. Additionally, the user may be living among a different set of neighbors, each with a different set of shopping behavior patterns. Accordingly, the contextual similarity between the user's shopping pattern and other users' shopping patterns may be different than was represented in the previously generated embedding table.

The processing computer described above may generate a new embedding table (e.g., on a monthly basis) to account for changes in user behaviors. However, the risk prediction model may be updated less frequently (e.g., once a year), due in part to the amount of computing resources required generate a new risk prediction model. The processing computer may generate a mapping between the new embedding table and an older embedding table by training a transformation model. In an embodiment, the transformation model may include a non-linear neural network with an activation function, whereby the neural network is trained by minimizing a loss function. In this way, the transformation model may be able to account for substantial changes in a user's context relative to other users (e.g., moving to a new city).

Upon training the transformation model (e.g., determining the mapping), the processing computer may input the newly generated user embedding into the transformation model, which in turn may output a transformed embedding. In this example, the new-relocated user may purchase a meal from a restaurant in the new city. The processing computer receives the purchase authorization request that includes the user identifier (e.g., the same PAN as the previous example). However, in this case, the processing computer may use the PAN to retrieve the transformed embedding. The transformed embedding, along with other transaction information (e.g., merchant identifier, transaction amount, etc.), may be input to the previously trained risk prediction model to output an access score. In this way, the access score may reflect the latest contextual information about a user's shopping behavior. For example, the access score incorporate contextual information indicating that the user has recently started making frequent purchases in this new location, and thus the access score may indicate a lower level of risk. It should be noted that this access score may be produced without requiring the risk prediction model to be re-trained at the same frequency that new embeddings are generated.

Embodiments of the disclosure provide for a number of technical advantages over conventional systems. Existing systems have limited information when determining whether to authorize a user to have access to a resource. For example, existing systems may have access to a history of previous transactions by the user, as well as whether those transactions were approved or denied. However, storing this information takes significant resources (e.g., memory, storage space). Furthermore, significant processor resources may be required to utilize this information at run-time to generate an accurate prediction score for a given transaction. When considering a large number of transactions over many users, the amount of processing resources required is significant. In contrast, embodiments of the present invention rely on a smaller storage and memory footprint through the use of embedding vectors that capture contextual (and historical) information about a user. Additionally, the system requires fewer processor resources at run-time to generate an accurate access score, by utilizing a prediction model trained based in part on an embedding layer.

In another example, embodiments of the present invention allow for fewer resources to be used to update contextual data for a given user over time. For example, existing systems that utilize prediction models may require significant computing resources to retrain a prediction model. If a prediction model is not retrained frequently, then an access score may not incorporate the latest data about a user, and therefore accuracy may degrade over time. In contrast, embodiments of the present invention utilize a transformation model to transform new user contextual data such that the data may be presented for analysis by a previously trained prediction model. Furthermore, the transformed context may incorporate both older and newer contextual data to be used by the prediction model in analysis. In this way, the present invention enables further saving of computing resources while maintaining accuracy over time in determining a risk prediction score, even as new data becomes available. The use of a non-linear transformation model also may improve accuracy in transforming not only smaller (incremental) data updates, but also substantial data updates.

I. Authenticating an Access Request Using Embeddings

Multiple devices may be involved in processing an access request, as describe further below in reference to FIG. 1. For example, in a communication network, a processing network (e.g., including a processing computer) may operate as a third-party trusted intermediary between a user device and an authorizing entity. The processing computer may perform several functions, including processing, verifying, and accepting or declining an access request on behalf of the authorizing entity. As part of the verification process, described further below in reference to FIG. 2, the processing computer may generate an access score that indicates a level of authenticity for authorizing the access request for a resource, upon which the access score may be transmitted to the authorizing entity for use in making an authorization decision.

A. System

FIG. 1 depicts a block diagram of a system 100 for generating an access score, according to an embodiment of the invention. The system 100 comprises a user device 102 which may be associated with a user 101, a resource provider computer 104, a processing computer 106, and an authorization computer 108.

The user device 102, the resource provider computer 104, the processing computer 106, and the authorization computer 108 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The user device 102 may be associated with a user identifier of the user 101. In some embodiments, the user device 102 may be an access card (e.g., a credit card or debit card). In other embodiments, the user device 102 may be a mobile phone that stores credentials and/or token information that may be used to obtain access to a resource. In a payment transaction example, a user identifier may be a PAN of the user 101, which may be stored on an access card 102 of the user 101 and/or on the user's mobile phone 102. Any suitable user device 102 may be used by which an associated user identifier may be obtained to be included in an access request. Although embodiments discussed herein are primarily related to a payment transaction context, it should be understood that the invention may be performed in other types of environments involving access requests for a resource (e.g., obtaining access to a secure building).

The resource provider computer 104 may be a device associated with a resource provider. The resource provider computer 104 may receive an access request from a user device 102 and transmit the request to a processing computer 106. The resource provider computer 104 may additionally include a resource provider identifier associated with the resource provider within the access request. In some embodiments, the resource provider computer 104 may include any other suitable information for including within the access request, including, but not limited to, a transaction amount, a zip code, a currency code, an authorizing entity identifier, a resource identifier, etc. In some embodiments, the resource provider computer 104 may be an access device (e.g., POS terminal), or a server computer connected to an access device. In other embodiments, user device 102 may be an access device operated by a resource provider, with resource provider computer 104 being a server connected with the access device.

The processing computer 106 may be a server computer that is affiliated with an access request processing network that is a trusted intermediary between the resource provider computer 104 and an authorization computer 108 of an authorizing entity. In some embodiments, the processing computer 106 may be part of the same organizational entity as the authorizing entity. In other embodiments, the processing computer 106 may be associated with a third-party trusted entity. As described above, the processing computer 106 may perform several functions, including verifying the user device 102 to determine a level of authenticity (e.g., risk) for authorizing the access request for a resource. For example, the processing computer 106 verification process may assess whether the user device 102 (e.g., a payment card) has been stolen and is being used by an unauthorized user in a fraudulent transaction. To determine the level of risk, the processing computer 106 may utilize an authenticity model 110 to generate an access score that indicates the level of risk of authorizing the access request for a resource. Authenticity model 110 can implement user embeddings and embedding mappings, as described in more detail later. As described in more detail below, the authenticity model 110 may utilize one or more machine learning models to generate the access score. Upon generating the access score, the processing computer 106 may transmit the access score to the authorization computer 108.

The authorization computer 108 may be a server computer that is affiliated with an authorizing entity. The authorizing entity may be an issuer which issued the user device 102 to the user 101, and/or provisioned the user device 102 with credentials (e.g., a payment token) to be used in a future access request for a resource. In some embodiments, the user identifier associated with the user device 102 is registered with the authorization computer 108 to be used in authorizing an access request. When determining whether to approve an access request, the authorization computer 108 may utilize its own risk prediction model (not shown in FIG. 1) that may rely on domain knowledge data that is not available to the processing computer 106. This data may include, for example, the user's social security number, home address, phone number, credit lines, loan payment history, etc.

Beyond using its own risk prediction model, the authorization computer 108 may also utilize the access score generated by the processing computer 106 to determine whether to approve or decline the access request. The access score may incorporate domain knowledge that is not accessible (or stored) by the issuer. For example, the processing computer 106 may store and analyze transaction data between users and merchants to detect patterns in shopping behavior which may not be stored by the issuer. These patterns may be incorporated into the access score, which may be incorporated into the risk model of the authorization computer 108. In some embodiments, the authorization computer 108 may solely rely on the access score generated by the processing computer 106 in determining whether to approve or deny the transaction. Upon determining whether to approve or deny the access request, the authorization computer 108 may then transmit an authorization response back to the processing computer 106, when may then relay the response to the resource provider computer 104.

For clarity, a certain number of components are shown in FIG. 1. It is understood, however, that embodiments of the disclosure may include more than one of each component. In addition, some embodiments of the disclosure may include fewer than or greater than all of the components shown in FIG. 1.

B. Processing Computer

Figure 2:
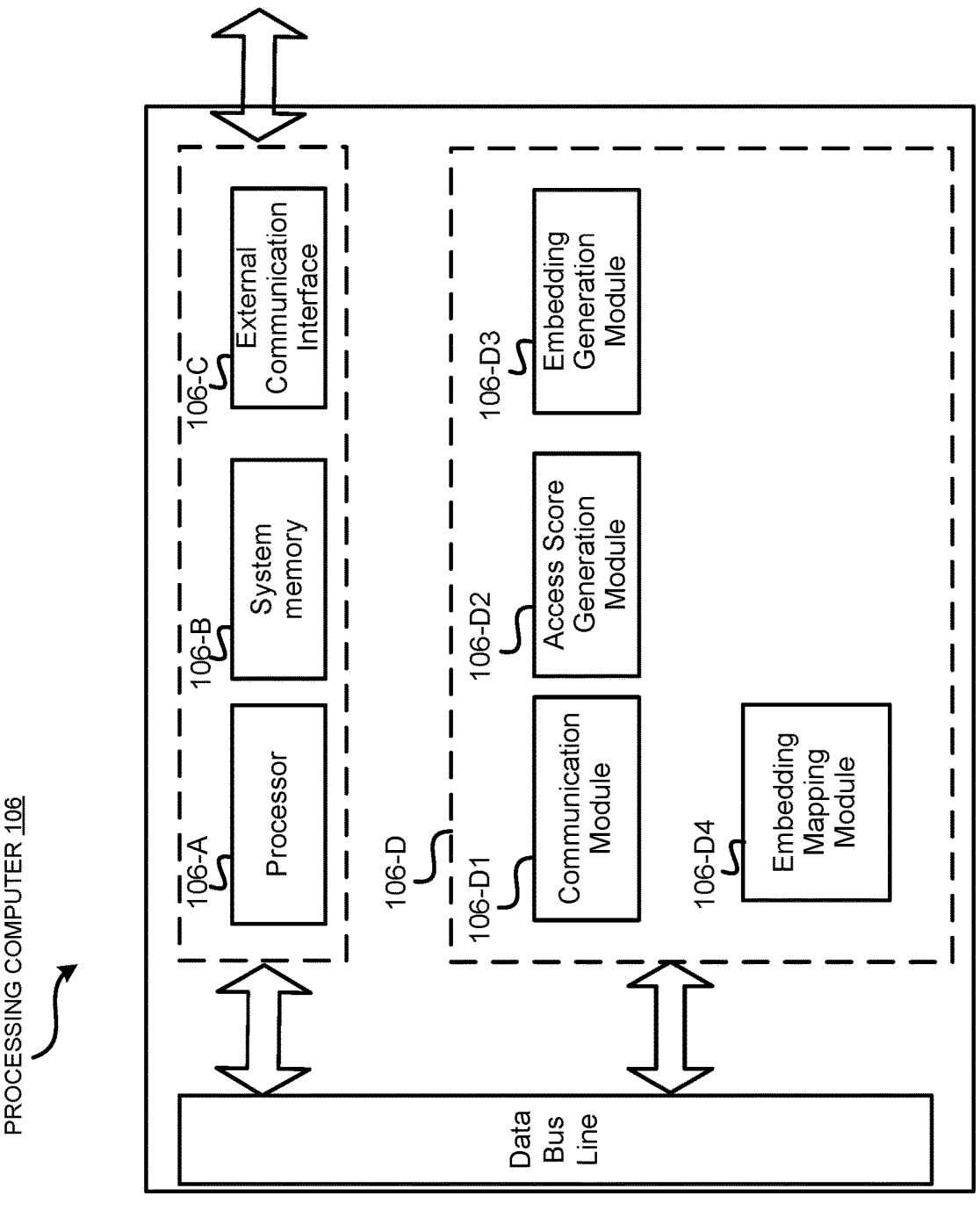
FIG. 2 depicts a block diagram of a processing computer of the system, according to an embodiment of the invention.

FIG. 2 depicts a block diagram of a processing computer of the system, according to an embodiment of the invention. The processing computer 106 may include a processor 106-A, which may be coupled to a system memory 106-B and an external communication interface 106-C. A computer readable medium 106-D may also be operatively coupled to the processor 106-A.

The computer readable medium 106-D may include a number of software modules including a communication module 106-D1, an access score generation module 106-D2, an embedding generation module 106-D3, and an embedding mapping module 106-D4. It should be understood that one or more of these modules may be included within the authenticity model 110 of FIG. 1. Accordingly, as discussed below, authenticity model 110 may itself include one or more sub-models (e.g., machine learning models) that may be in association with each other.

The communication module 106-D1 may comprise code that causes the processor 106-A to generate messages, forward messages, reformat messages, and/or otherwise communicate with other entities.

The access score generation module 106-D2 may comprise code that causes the processor 106-A to generate an access score for a particular access request. To generate the access score, the access score generation module 106-D2 may generate and maintain a machine learning model that is trained to output an access score based at least in part on receiving an embedding (e.g., a user embedding) as input, as well as other input. (As discussed herein, this machine learning model may also be referred to as a "prediction model" or "authenticity model"). In some embodiments, as discussed further below in reference to FIG. 3, the machine learning model may be a neural network. In some embodiments, the machine learning model associated with generating the access score may be re-generated on a pre-determined cadence (e.g., once a year).

The embedding generation module 106-D3 may comprise code that causes the processor 106-A to generate an embedding table. To generate the embedding table, the embedding generation module 106-D3 may receive training data that includes a plurality of user identifiers that are respectively associated with user devices. Each user identifier of the plurality of user identifiers may be selected to be included within the training data based at least in part on appearing in at least one previous access request with a particular resource provider identifier. The embedding generation module 106-D3 may input the training data into a machine learning model, which in turn produces a vector space of a plurality of dimensions (e.g., 200-300 dimensions), whereby each user identifier is assigned a corresponding vector in the space. The vectors are positioned in the vector space such that user identifiers that share a common context are located in close proximity to one another in the space. The plurality of vectors are included within the embedding table.

In some embodiments, the embedding generation module 106-D3 may re-generate the embedding table on a pre-determined cadence that is more frequent (e.g., once a month) than the prediction model that generates the access score. This may be due to the fact that user behavioral patterns are continually changing. It should be understood that the dimensions of the vector spaces between successive embedding tables may correspond to different aspects of a context, even if the respective embedding tables were generated in close temporal proximity to each other. This may be due to, for example, an initialization factor (e.g., entropy) introduced when training the neural network.

The embedding mapping module 106-D4 may comprise code that causes the processor 106-A to generate and maintain a transformation model to be used in generating a transformed embedding. To generate the transformation model, the embedding mapping module 106-D4 may receive as training data a previously generated embedding table and a new embedding table. Both embedding tables may be generated based at least in part on a similar (e.g., identical) set of user identifiers, such that a ground truth mapping between user identifiers in each set is determinable. However, even though both embedding tables may be generated based at least in part on a similar set of user identifiers, the vectors of each embedding table may respectively correspond to different vector spaces (e.g., due to an initialization factor, discussed above, and/or due to changes in user behavior patterns).

Once the transformation model (e.g., mapping) is generated, the embedding mapping module 106-D4 may receive as input a user embedding from the new embedding table and output a transformed embedding. The transformed embedding may capture contextual information from both the older and newer embedding. Additionally, the transformed embedding may be suitable for input into a previously trained prediction model for generating an updated access score.

II. Generating an Access Score by a Prediction Model Using an Embedding as Input The authenticity model 110 may have multiple layers that are used to generate an access score, as described further below in reference to FIG. 3. For example, in an embodiment where the authenticity model includes a neural network, the neural network may have multiple layers. One of the layers may be an embedding layer, which may consist of one or more embedding tables. Each embedding table may be first generated by another machine learning model, described further below in reference to FIG. 4, and then subsequently used to train the neural network of the prediction model. An example of a generated embedding table is depicted in FIG. 5.

A. Utilizing a Neural Network to Generate the Access Score

FIG. 3 depicts a prediction model of a processing computer used for generating an access score by utilizing an embedding layer, according to an embodiment of the invention. The prediction model 300 may include a neural network with multiple layers (e.g., hidden layers) that include the embedding layer. In an embodiment, the neural network 300 may be a deep recurrent neural network (RNN) with long short-term memory (LSTM). For more information on RNN's with LSTM, see, for example, Fundamental of Recurrent Neural Network (RNN) and Long Short-Term Memory (LSTM) Network, Alex Sherstinsky, 2018, arxiv.org/abs/1808.03314.

A trained neural network 300 may generate an access score based at least in part on receiving as input one or more values. For example, continuing with the payment transaction example, an access request for a current transaction (t) may include multiple elements, including a user identifier 302 (e.g., cardholder ID), a resource provider identifier 304 (e.g., merchant ID), and one or more numeric values 306 (e.g., zip code, transaction amount, merchandise ID, etc.). The elements of the access request may be input to an input layer for subsequent processing by each of the layers of the trained neural network 300, which eventually outputs an access score.

Turning to each of the layers of neural network 300 in further detail, the embedding layer 308 may include one or more embedding tables. Each embedding table may be generated by training a model, discussed below in reference to FIG. 4, to determine a vector space for a certain type of "word." For example, a user identifier (e.g., cardholder ID, such as a PAN) may be a type of word, among a "vocabulary" of words (e.g., other cardholder ID's for other users) that is used to generate a user embedding table 309. Another type of word may be a resource provider identifier, which may be used to generate a resource provider embedding table, 310, and similarly, a numeric value embedding table 312 may also be generated. As discussed herein, primary focus is given towards a user embedding table 309 as input to the neural network 300, since the context of user behavior is more likely to frequently change than, for example, merchant behavior. However, it should be understood that the neural network 300 may be trained used any one or combination of embedding tables.

Next, the embedding tables from the embedding layer 308 may be used to train a dense layer 314. In an embodiment, the dense layer 314 may be fully connected with the dimensions of each embedding table. For example, if a user embedding table 309 has 200 dimensions, then the dense layer 314 may have 200 nodes. In some embodiments, an embedding table may have more dimensions than there are dense layer nodes. In this case, the neural network 300 may be trained to determine a weight for mapping each dimension to a node of the dense layer, such that the dimensions can be properly mapped to the dense layer. It should be understood that there may be different numbers of dimensions for each embedding table, and thus there may be different weightings assigned for dimensions of each embedding table. As discussed further below, it should further be understood that the dimensions of each embedding table may be used to determine weights for nodes of any of the layers of neural network 300 using any suitable method.

The dense layer 314 may be then be input into the LSTM layer 1 316, and which in turn may be input to LSTM layer 2 318. In an example, the LSTM layers may be used to embed issuers' decisions into the inner structure of the neural network 300, without needing to store a history of users' historical transactions. From the LSTM layers, the output may next be input into an attention layer 320. The attention layer may be used to improve the performance of the encoder-decoder mechanism of the neural network 300. For more information on attention mechanisms, please see, for example, Attention Is All You Need, Vaswani, et. al, 2017, papers.nips.cc/paper/7181-attention-is-all-you-need.pdf. Finally, the output of the dense layer 314 may be input into a softmax layer 322 that maps the non-normalized output of the attention layer 320 to a probability distribution via an activation function. The probability distribution may thus be reflected in the access score that is output by the neural network 300.

While the embodiment depicted in neural network 300 of FIG. 3 includes multiple hidden layers, it should be understood that any suitable number of layers may be used to perform embodiments of the invention.

B. Generating an Embedding Table

Figure 4:
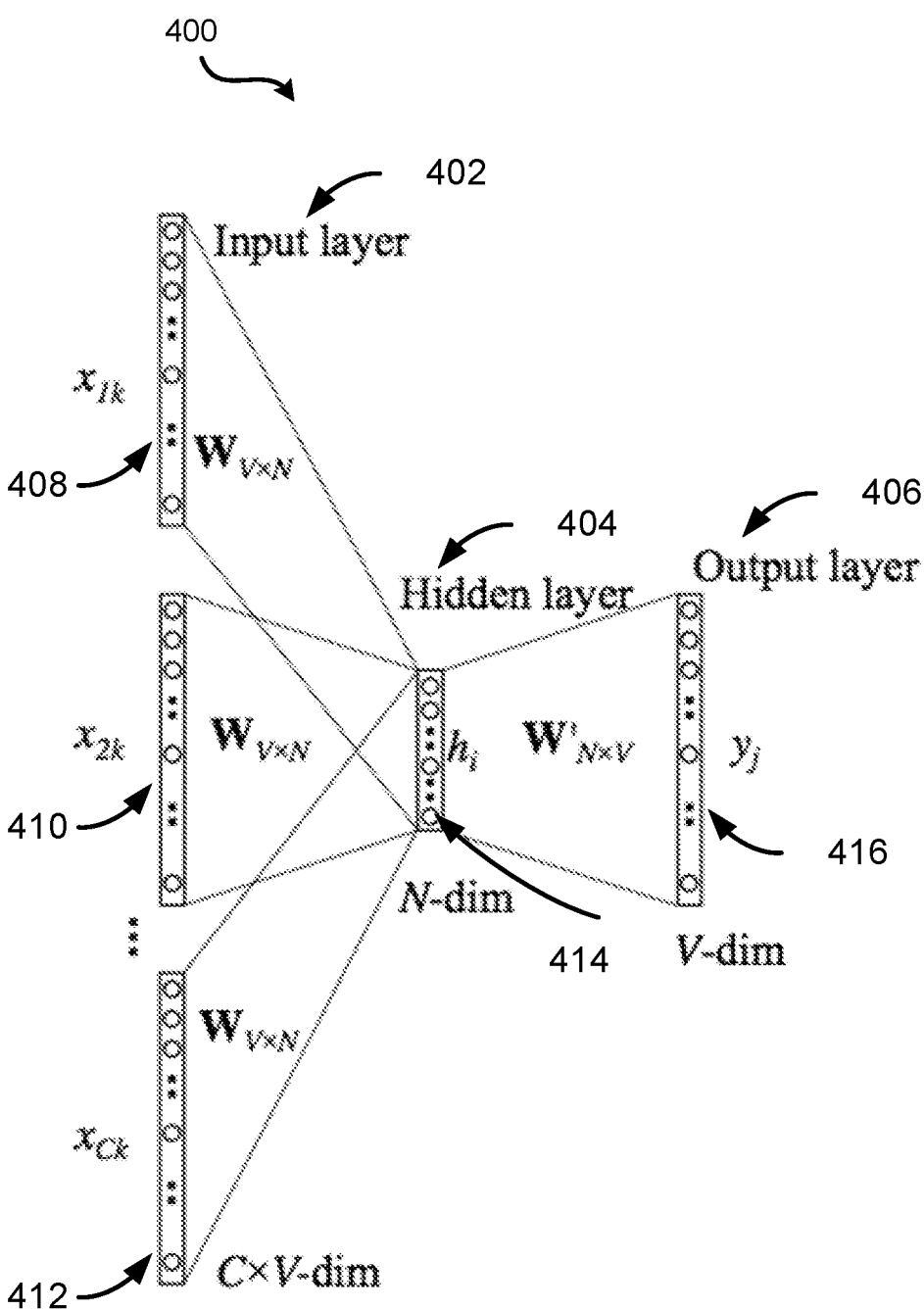
FIG. 4 depicts a process for generating an embedding table of embeddings, according to an embodiment of the invention.
Figure 5:
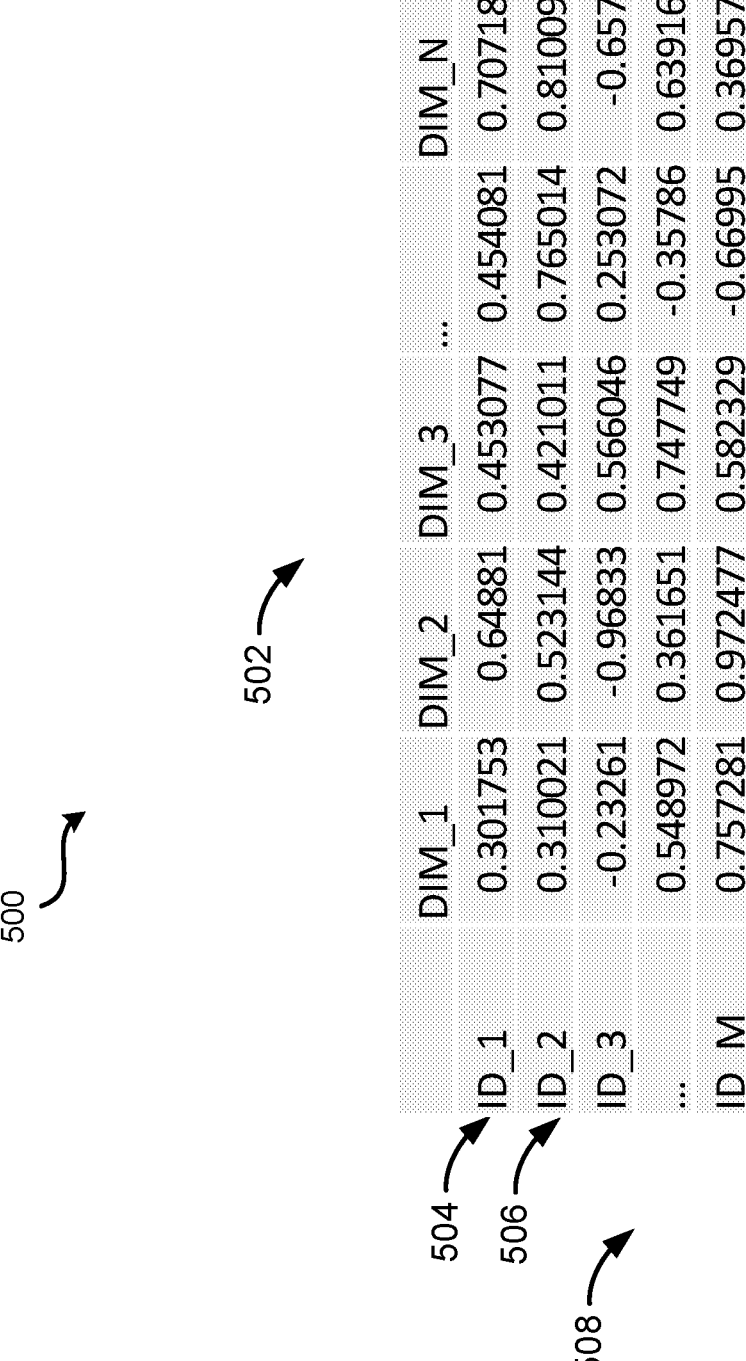
FIG. 5 depicts an example embedding table of embeddings, according to an embodiment of the invention.

FIG. 4 depicts a process for generating an embedding table of embeddings, according to an embodiment of the invention. The process may include training a neural network 400 with at least one hidden layer. In one embodiment, the neural network 400 may be a feed-forward neural network with a single hidden-layer. In the embodiment discussed below in reference to FIG. 4, a continuous bag-of-word (CBOW) model is used for illustration purposes only. However, it should be understood that any suitable method may be used to generate an embedding table. For example, a skip-gram (SG) model may also be used to generate an embedding table. For more information on both types of models, which both employ a word2vec model, see, for example, word2vec Parameter Learning Explained, Xin Rong, 2014, arxiv.org/abs/1411.2738.

In neural network 400, there are three layers: an input layer 402, a hidden layer 404, and an output layer 406. The input layer 402 may receive as input a sequence of "words" that are included in a "document." In one example, involving generating a user embedding table (e.g., 309), a "word" may correspond to a user identifier. In this example, a plurality of user identifiers may be selected and grouped within the same document at least because they have performed an access request to obtain a resource from the same resource provider. In a payment transaction example, multiple cardholders may have purchased goods from the same merchant, and thus, the PANs for each cardholder are included within the same document that is associated with the merchant (e.g., merchant identifier). Furthermore, each purchase may have occurred at a different time relative to the other purchases. Thus, the PANs for each cardholder may be organized sequentially within the document, in relative temporal proximity to the other PANs that purchased a good from the same merchant.

It should be understood that, although a user embedding table is discussed primarily herein, the process described in reference to FIG. 4 can be used to generate other types of embedding tables (e.g., a resource provider embedding table), which may in turn be used to train the prediction model 300 of FIG. 3. For example, in the case of a resource provider (e.g., merchant) embedding table, a "word" may correspond to merchant identifier, and a "document" may be associated with a cardholder ID (e.g., PAN). Thus, the document may contain, for example, a list of all merchants that have executed transactions with the given PAN.

Continuing with FIG. 4, each context word (e.g., user identifier) in the document may be input to the input layer 402 (e.g., word $x_{1k}$ 408, word $x_{2k}$ 410, . . . , word $x_{ck}$ 412). In the example of FIG. 4, each word of the input layer may be represented as a hot-encoded two-dimensional (2D) matrix (C×V dimensional matrix), where C represents the number of words in a context (e.g., a document), and V is the total number of words in the vocabulary (e.g., the total number of possible user identifiers). Each input of the input layer (total of C context words) then gets mapped to the hidden layer 404 via a respective weight matrix $W_{V \times N}$, where N is the number of dimensions of the hidden layer 404. After $W_{V \times N}$ is used to calculate the hidden layer inputs for each input context word, the process then computes an average over all the C context word inputs to compute the N-dimensional hidden layer as vector h 414. Finally, $W_{N \times V}$ is another weight matrix that maps the hidden layer outputs to the output layer 406 (N×V dimensional matrix) to output a word as vector y 416.

In this CBOW model, the process thus takes the context of multiple words as the input and is trained to predict another word based on the context. In some embodiments, the hidden layer 404 nodes can copy the weighted sum of inputs to the next layer, and therefore, there is no activation like sigmoid, tanh, or rectified linear unit (ReLU) employed in the hidden layer. In some embodiments, a non-linear softmax calculation may be used to generate the output layer. Thus, by performing this process of training the neural network 400, an embedding table may be generated as a byproduct of the process. In some embodiments, this embedding table may correspond to the weight matrix $W_{V \times N}$. In other embodiments, this embedding table may correspond to the weight matrix $W_{N \times V}$. In some embodiments, the neural network 400 may be trained based at least in part on minimizing a loss function (e.g., mean-squared error (MSE)). The loss function may be configured to determine a difference between a ground truth user identifier and a predicted user identifier. The ground truth user identifier may correspond to a word that is the known correct output based on the multiple words that were input to the neural network 400.

FIG. 5 depicts an example embedding table of embeddings, according to an embodiment of the invention. In an example, the embedding table 500 depicted in FIG. 5 may be generated by the neural network 400 of FIG. 4. The embedding table 500 may be a two-dimensional table consisting of rows 508 and columns 502. The rows 508 may each correspond to an embedding vector for a word. Continuing with the user embedding example, "ID_1" of the first row 504 may correspond to a user identifier (e.g., a PAN, a hash value of a PAN, etc.). Meanwhile each of the columns 502 may correspond to a different dimension of a vector space. It should be understood that the number of dimensions may vary between embedding tables, and the number for any given table may be fixed during training of the embedding model (e.g., a neural network). In some embodiments, the number of dimensions may be between 100-300 dimensions. The vector value corresponding to a particular dimension and may be a real number between −1 and 1.

It should be understood that, while the multi-dimensional space allows for a similarity of the context of user identifiers to be identified, the meaning each dimension may be a latent feature that is not pre-determined before generating the embedding table. For example, each dimension itself may not related to a specific similar characteristic (e.g., geography) of the two user identifiers, but instead may have multiple characteristics embedded into a meaning for each dimension.

As an illustration for comparing vectors to determine a context similarity, consider row 504 and row 506. To determine if the respective embeddings corresponding to row 504 (ID_1) and row 506 (ID_2) have similar contexts, the respective vector values for each embedding may compared. For example, in some embodiments, the system may compute a cosine distance between the respective vectors for row 504 and row 506 (e.g., between all of the dimensions 502 for each respective vector). In one example, the computed cosine distance for these numbers may be minimal, and thus, may contribute to determining that the contexts are similar. In some embodiments, for example if the embedding vectors are normalized, a Euclidean distance between vectors ID_504 and ID_506 may be computed to determine a similarity between the two vectors.

C. Methods

FIGS. 6 and 7, respectively show flow charts for generating an access score using a prediction model and for generating a user embedding table to be used as an embedding layer for training the prediction model. The process 600 of FIG. 6 may utilize a similar prediction model to that depicted in FIG. 3, and the process 700 of FIG. 7 used to generate the embedding table may utilize a similar neural network to that depicted in FIG. 4.

1. Method for Utilizing a Neural Network to Generate the Access Score

FIG. 6 depicts a flowchart for generating an access score by a prediction model, according to an embodiment of the invention. At block 602, a system may receive an access request to access a resource (e.g., building, merchandise, secure file on a server) by a user device. In some embodiments, the access request may include a resource provider identifier (e.g., a merchant ID) and a user identifier (e.g., user account number such as a PAN). The user identifier may be one of a plurality of user identifiers that are issued by an issuer (e.g., PANs issued by a bank, and used in access requests from different users). Each user identifier of the plurality of user identifiers may respectively be associated with a user device (e.g., a payment card, mobile device) that is included within a plurality of user devices.

At block 604, the system (e.g., a processing computer) may retrieve from an embedding table (e.g., a user embedding table 500 of FIG. 5) an embedding (e.g., user embedding 504) that is associated with the user identifier received at block 602. The user embedding may include a plurality of dimensions (e.g. columns 502 of FIG. 5), whereby each dimension of the plurality of dimensions is associated with a context of the user identifier among other user identifiers within a contextual space. In an embodiment, the context may correspond to the user identifier appearing in previous access requests within temporal proximity to other access requests from a subset of other user devices of the plurality of user devices. The user embedding may provide a multi-dimensional data point indicating a similarity of the user device to the subset of other devices. In some embodiments, the multidimensional data point may correspond to a vector, and each value of the vector is associated with a dimension of the plurality of dimensions.

At block 606, the system may input the user embedding into a machine learning model (e.g., the prediction model 300 of FIG. 3) of the system that is trained using the embedding table from which the user embedding was retrieved. In some embodiments, the machine learning model may be trained based at least in part on training data that corresponds to a plurality of previous access requests, whereby the authenticity of the previous access requests is known (e.g., fraudulent or not fraudulent). The machine learning model may also be trained based on the embedding table from which the user embedding was retrieved, as described above in reference to FIG. 3. In some embodiments, other embedding tables within the embedding layer 308 may also be used to train the machine learning model. Based at least in part on the embedding table and the plurality of previous access requests with known authenticity, parameters of the model (e.g., weights for nodes of the neural network 300) may be optimized to provide accurate access scores. In some embodiments, determining the weights for the nodes of the machine learning model may include mapping dimensions from each embedding table to one or more layers of the neural network 300 (e.g., dense layer 314) in FIG. 3.

At block 608, the machine learning model may determine an access score for determining whether to authorize the user device to access the resource. In some embodiments, the access score may correspond to a level of authenticity of authorizing the user device to access the resource. Upon determining the access score, the system may transmit to an authorization computer (e.g., a bank server of the bank that issued a payment card to the user) an authorization request message including the access score. Subsequently, the system may receive an authorization response message from the bank server including the authorization response. In some embodiments, the authorization response may be based at least in part on the access score. The system may then transmit the authorization response (e.g., Approved or Denied) to an access device (e.g., POS terminal) associated with the resource provider, whereby the authorization response is used to determine whether to provide the resources to the user.

2. Method for Generating an Embedding Table

FIG. 7 depicts a flowchart for generating an embedding table, according to an embodiment of the invention. In some embodiments, the generated embedding table may be similar to embedding table 500 depicted in FIG. 5.

At block 702, the system may receive training data comprising a second plurality of user identifiers (e.g., user identifiers 408, 410, and 412 of FIG. 4). The second plurality of user identifiers may be respectively associated with the subset of the other users devices described in reference to block 604 of FIG. 6. Each user identifier of the second plurality may be selected to be included in the training data based at least in part on appearing in at least one previous access request with a common resource provider identifier. For example, multiple cardholders may have shopped at the same merchant. In another example, multiple employees may request to obtain access to the same building.

At block 704, the system may input the training data into a second machine learning model of the system that includes a neural network (e.g., the neural network 400 of FIG. 4). It should be understood that several sets of training data (e.g., "documents") may be used as input to train the machine learning model. For example, one subset of cardholders may have all shopped at merchant A at least once over a period of time, while another subset of cardholders may have all have shopped at merchant B over the same period of time. Accordingly, in this example, two groupings may be created (e.g., merchant groups), which are used to train the machine learning model to generate an embedding table. It should also be understood that, in the example of generating a user embedding, a user identifier that is used to train the machine learning model may contain multiple elements of information about the user device and/or the user. For example, the user identifier may contain a PAN, demographic information, home address, zip code, etc.

At block 706, the second machine learning model trained at block 704 may generate an embedding table based at least in part on the one or more sets of training data.

III. Generating an Access Score by a Previously Trained Prediction Model Using a Transformation Model New embedding tables may be generated on a predetermined cadence (e.g., once a month), which capture updated contexts for a given user identifier. However, a previously trained prediction model (e.g., prediction model 300 of FIG. 3) may be trained based at least in part on a different contextual space (e.g., corresponding to a previously generated embedding table) than an updated contextual space. Accordingly, as described below, a system may use a transformation model to generate a transformed embedding from a new embedding, such that the contextual space of the transformed embedding corresponds to the previously trained weights of the prediction model. While a linear transformation model may accurately account for smaller changes for a context space, in some embodiments, a non-linear transformation model may better account for larger changes to a context space. In this way, the previously trained prediction model may output an accurate access score that takes into account contextual information from both an old and a new embedding.

A. Accounting for Updated Contextual Information Over Time

As discussed above, the way in which a user may use their user device may continually change over time. Some behavioral changes may be smaller, for example, visiting a newly opened restaurant in the neighborhood where the user lives. However, some behavioral changes may be more substantial. For example, a user may move to a new city, and therefore shop at a new set of merchants. The user may also have other life changes (e.g., new member of the family, new employer, etc.), which may prompt significant changes in the way the user utilizes the user device to access resources. Accordingly, when a new embedding table is generated over a plurality of user identifiers, the contextual space of the new embedding table may significantly differ from the old embedding table.

Figures 8A, 8B:
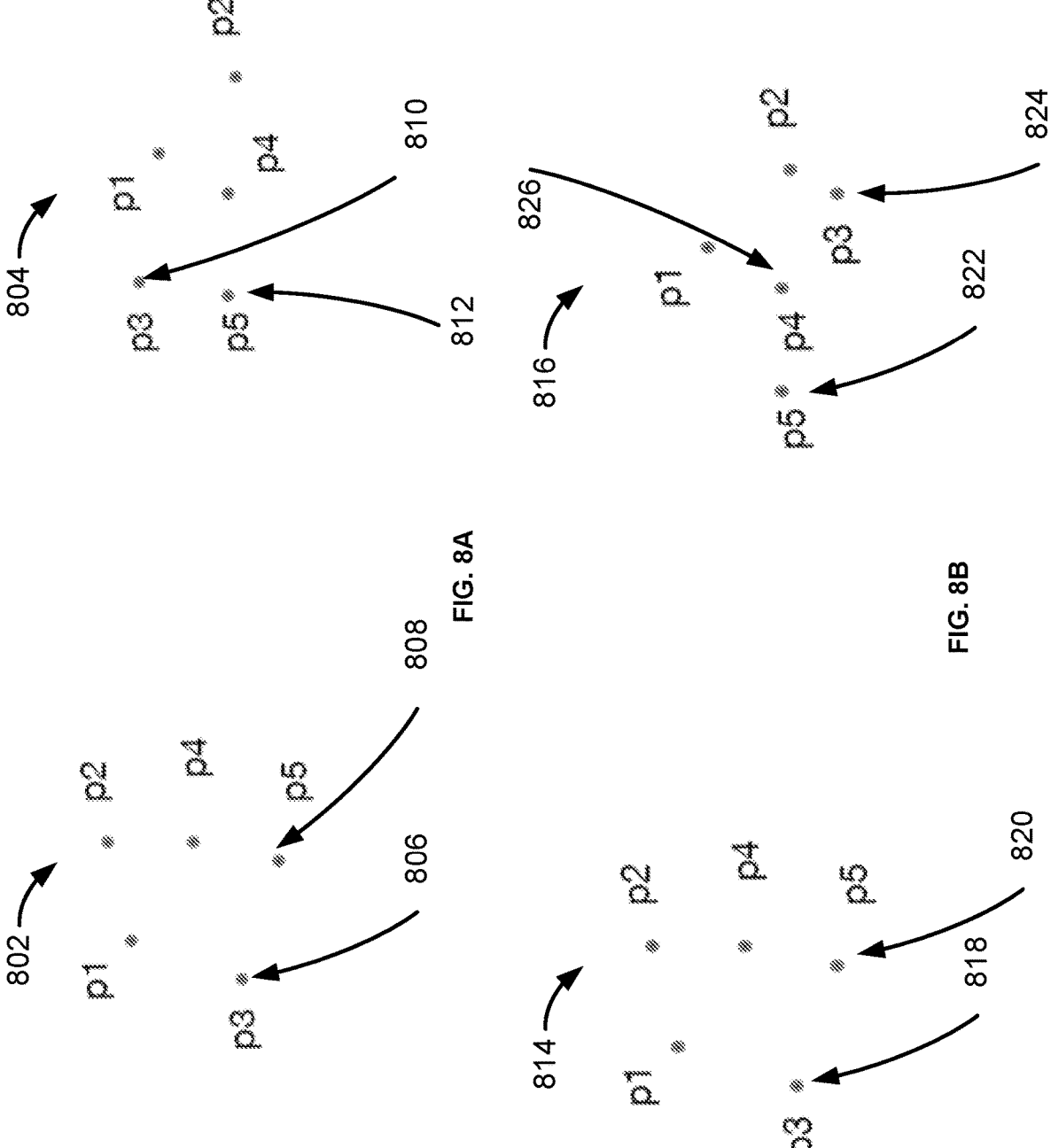
FIG. 8A depicts an example of two groups of embeddings respectively generated from different spaces, according to an embodiment of the invention.
FIG. 8B depicts an example of two groups of embeddings respectively generated from different spaces, according to an embodiment of the invention.

FIGS. 8A and 8B depict two side-by-side comparisons of groups of embeddings that are respectively generated from different spaces.

FIG. 8A depicts an example side-by-side comparison where the respective space of each group of embeddings is rotated, but otherwise each embedding maintains a similar relative position (e.g., context) compared to other embeddings in the group. In group 802, each of the points p1-p5 may represent one or more embeddings. In one embodiment, as an example, p3 806 may represent an embedding for a single user identifier (e.g., cardholder) that has executed many transactions. However, as another example, p5 808 may represent an aggregate of multiple cardholder embeddings (e.g., averaged together), whereby each cardholder included in the aggregate may only have executed a few transactions. In this embodiment, by aggregating cardholder embeddings together for cardholders with fewer transactions, this may improve accuracy when subsequently training the transformation model. In some embodiments, embeddings may be aggregated using any suitable mechanism (e.g., by country, state, city, user demographic, etc.), and may be performed as a pre-processing step prior to generating a transformation model. For clarity of illustration purposes only, as discussed below in reference to both FIGS. 8A and 8B, each of p1-p5 may correspond to an embedding of a single user identifier.

Next, in group 804 of FIG. 8A, each of the embeddings from group 802 may have been re-generated in an updated embedding table. In this case, while each embedding from group 804 may correspond to the same user identifier, the space for each group is different. However, as noted above, while the space of each group of embeddings is rotated, each embedding maintains a similar relative position compared to other embeddings in the group. For example, p3 806 and p5 808 of group 802 remain neighbors in an updated space of group 804, as seen by p5 812 and p3 810. The groups may generally be seen as being rotated, in this case counterclockwise, resulting in a new space.

As noted earlier, this rotation may be due to new data that registers smaller changes in user behavior between embedding regeneration. It may also be simply because the machine learning model used to generate a new embedding table may require an initialization (e.g., an entropy or randomness factor) that effectively causes each point p1-p5 to be rotated in the contextual space. However, in either case (e.g., new data or entropy factor), because the points of each group in FIG. 8A still remain in a relatively similar proximity to each other, a linear transformation model may be used to rotate from the new space to the old space (discussed further below). It should be understood that a rotation may be performed in either direction (e.g., rotating group 804 space to align with group 802 space, or vice versa).

FIG. 8B depicts an example where the respective space of each group of embeddings has been significantly changed such that embeddings within a newly generated group have different positions relative to the embeddings with the previous group. Similar to FIG. 8A, in FIG. 8B, both group 814 and group 816 represent two groups of embeddings p1-p5. However, while p3 818 and p5 820 were immediate neighbors in group 814, they are no longer immediate neighbors in group 816. Instead, p3's 824 immediate neighbor becomes p4 826 instead of the new p5 822. In this case, and contrasting with FIG. 8A, because the points of each group now have different positions relative to the positions of points in the previous group (e.g., not just a rotated space), a linear transformation model may not provide as accurate results as a non-linear model (discussed further below).

B. Training a Transformation Model to map Embeddings Between Embedding Tables

A transformation model may be generated by using a machine learning model to map embeddings from one embedding table to another (e.g., mapping vectors in a source space to a target space). In one embodiment, a transformation model may map a set of vectors generated from a newly generated embedding table to a set of vectors generated from a previously generated embedding table (or vice versa).

The machine learning model may be trained using a supervised learning process. Given a set of vectors $X \in R^{m \times d_1} = \{x_1, x_2, \ldots x_n\}$, $x_i \in R^{d_1}$ in a source space and their corresponding vectors in a target space $Y \in R^{n \times d_2} = \{y_1, y_2, \ldots y_n\}$, $y_i \in R^{d_2}$, the model can be trained to find a mapping function f, such that all the vectors in the source space may be mapped to the target space as f(X), while minimizing a loss function L=l(f(X), Y). In some embodiments, the number of the dimensions of the source and target space $(d_1, d_2)$ may be between 200-300. The number of dimensions may be chosen using any suitable method, including, for example, based at least in part on the type of training data (e.g., user identifiers, resource provider identifiers, etc.)

1. Training a Linear Transformation Model

As discussed earlier, in some embodiments, a linear transformation model may be suitable for determining the mapping function f from the source space to the target space (e.g., if the spaces are rotations of one another). In this case, the linear model may be generated by calculating a mapping matrix $W \in R^{d_1 \times d_2}$, and minimizing the mean squared error (MSE):

$$L = \|x_i W - y_i\|^2$$

In this case, the optimal value of W may be calculated by a closed form solution. For a single vector $x_i$, the mapped vector could be calculated as $y_i' = x_i W$. In one example, where d1=d2, the dimensions of W may be 200×200. In other embodiments, d1 may not be identical to d2. For more information on this type of linear mapping, see for example, Joulin, A., et. al., Improving supervised bilingual mapping of word embeddings. CoRR abs/1804.07745 (2018). As mentioned above, a linear model may be useful for mapping high frequency words in a vocabulary (e.g., language), and for situations where the structures of high frequency words between two languages are similar. However, in cases where a "word" may be a user identifier such as a cardholder ID, the frequency of use between identifiers may have high variability (even with aggregation). Furthermore, the behavior of users may change rapidly and/or substantially over time, such that a linear mapping may not produce optimal accuracy.

2. Training a Non-Linear Transformation Model

In some embodiments, a non-linear transformation model may be more suitable for determining the mapping function f from the source space to the target space, especially in cases where word frequency in a language may have high variability (e.g., few transactions for a given cardholder ID) and/or the behavioral patterns of each word are subject to substantial changes over time (e.g., new shopping patterns due to users relocating to a new city). In one embodiment, the non-linear transformation model may include a neural network with a single hidden layer. In some embodiments, more than a single hidden layer may be used. Also, in some embodiments, the neural network may utilize ReLU as an activation function. In other embodiments, other activation functions may be used (e.g., Tan H). The model may be expressed with weights matrixes $W_1 \in R^{d_1 \times u}$, $W_2 \in R^{u \times d_2}$, and offset $b \in R^u$. For a vector $x_i$ in source space, the mapped vector in target space may be expressed as:

$$f(x_i)=y_i'=ReLU(x_iW_1+b)W_2$$

In this example, u may be the parameter for the model, which is the number of units (or hidden-layer nodes) of the non-linear model. For example, in one embodiment, u=1500. Furthermore, d1 and d2 may both be 200. In that case, $W_1$ may be a 200×1500 matrix, while $W_2$ may be a 1500×200 matrix. In some embodiments, a value of 1500 for u may prevent overfitting of training data while still achieving better performance than a non-linear model.

A loss function may be used to minimize the error during training. In one embodiment, a loss function may minimize the sum of cosine distances between vectors. The cosine distance may express the angular distance between two vectors so as to determine their similarity. The loss function in this case may be expressed as:

$$\sum_i dist_{cos}(y_i, f(x_i))$$

In some embodiments, a loss function expressed as the sum of cosine distance may allow a vector to be mapped to a target space within a small cosine distance ground truth and still achieve acceptable accuracy. In other embodiments, an MSE loss function (described above) may also be used to train the non-linear model.

3. Evaluation

An evaluation process may be used to evaluate either of the models described above (linear or non-linear). In one embodiment, a K-nearest neighbors algorithm may be used to determine whether the ground truth (y) is within an acceptable distance from the output of the model (y'). In a first step of this embodiment, the system may use the trained model (e.g., the non-linear transformation model) to map a test instance x to the target space. Second, the system may select a point y" in the target space based at least in part on y' as the answer of the mapping. Third, the system may calculate the K-nearest neighbor of y" in the target space (e.g., K=1, 5, 10) according to the cosine distance. Values of K may be predetermined by an administrator, depending on the level of accuracy required. For example, setting K=1 would require that y be within a single nearest neighbor of y" (e.g., least tolerance for error). In contrast, setting K=10 would allow y to be one of the 10 nearest neighbors of y".

It should be understood that y" (instead of y') may be used (in step 2 above) to calculate the K-nearest neighbor because the mapped vector y' may not be an existing point (e.g., an existing "word" such as a user identifier) in the target space, and thus, may not allow for accurate evaluation. Accordingly, the system may determine y" as an existing word in the target space, based at least in part on y'. In one embodiment, y" is selected by analyzing all other points' nearest neighbors in the target space and finding the rank of y' in each point's neighbor. Then, the system may select y" as the point where y' has the highest rank in the nearest neighbor list for all the points in the target space.

In some embodiments, based at least in part on an evaluation of the accuracy of the transformation model, the system may determine that the transformation model needs to be re-generated and/or the prediction model 300 of FIG. 3 may need to be regenerated. For example, the system may predetermine a threshold value that corresponds to an acceptable level of accuracy (e.g., a certain value for K). If the evaluation does not meet the threshold value, then the transformation model may be re-generated. Alternatively, the prediction model 300 may need to be re-trained with new weights based at least in part on updated dimensions from the updated embedding table.

Figure 9:
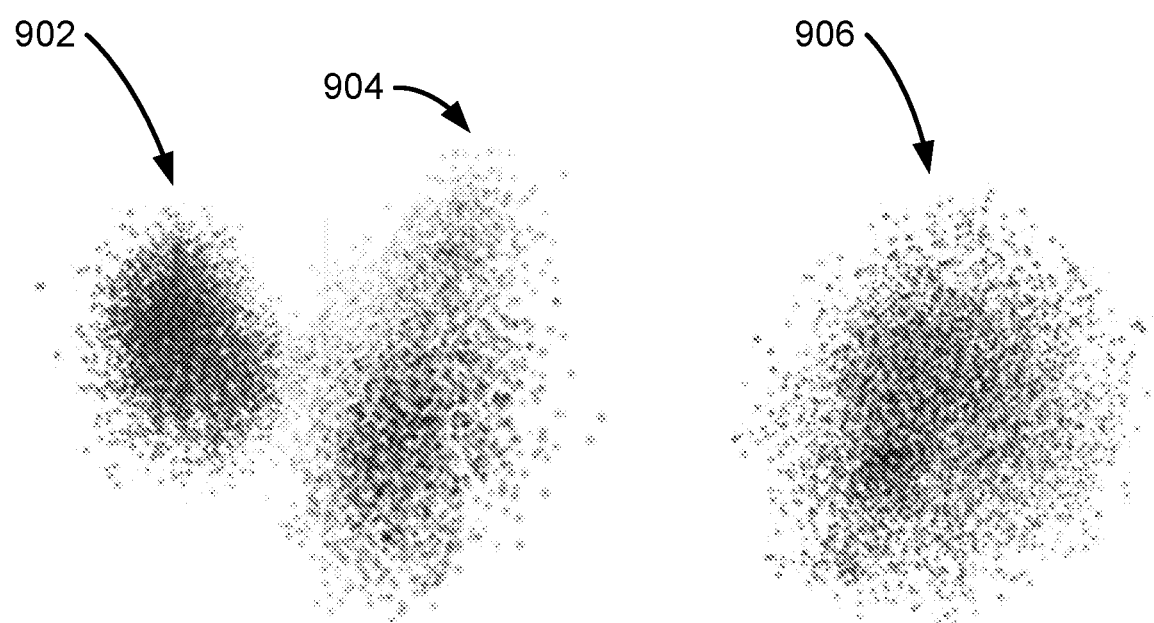
FIG. 9 depicts example results after mapping embedding vectors from a source space to a target space, according to an embodiment of the invention.

FIG. 9 depicts example results after mapping embedding vectors from a source space to a target space, according to an embodiment of the invention. In the illustration 900 of FIG. 9, group 902 may represent a first group of user embeddings from a first space. Also, group 904 may represent a second group of user embeddings from a second space, whereby user identifiers of the user embeddings of the second group respectively correspond to the same user identifiers as the first group. In an example, the first group 902 may be generated at a later point in time than the second group 904. As depicted, the first space and the second space do not significantly overlap, and thus, the embedding vectors within the first space do not map to the second space. However, upon inputting the group 902 into a transformation model (e.g., the non-linear transformation model described in reference to FIG. 8), a mapping 906 may be generated. The mapping 906 depicts each vector of first group 902 being mapped to the second space of group 904, effectively joining the spaces.

The training of the transformation model described above includes mapping a set of source vectors and target vectors, whereby there is a ground truth label indicating the proper target vector to which a particular source vector should be mapped. This allows for optimization of the model by minimizing a loss function. It should be understood, however, that a trained transformation model may receive as input a user identifier for which a user embedding (e.g., from a previously generated embedding table) may not previously exist.

In an example, a payment processing system may generate a new set of user embeddings every month, based at least in part on the previous six months of cardholder transaction data (e.g., January-June, February-July, etc.). Meanwhile, the prediction model 300 may be trained based at least in part on a particular set of six-month data (e.g., January-June), and only updated once a year. Suppose that a new set of cardholder transaction data may be received for the month of July. The new set of cardholder transaction data may include data from a new cardholder for which embedding vectors were not previously created and/or used to train the prediction model 300. However, the transformation model may be used to generate a transformed embedding vector that is aligned with the dimensional space that was used to train the prediction model 300, and thus, produce an access score. Additionally, by determining the mapping between the source and the target space, the transformation model may create a transformed embedding for existing cardholders that combines old and new contextual data together (e.g., January-July) within the same transformed embedding.

C. Methods

Figure 11:
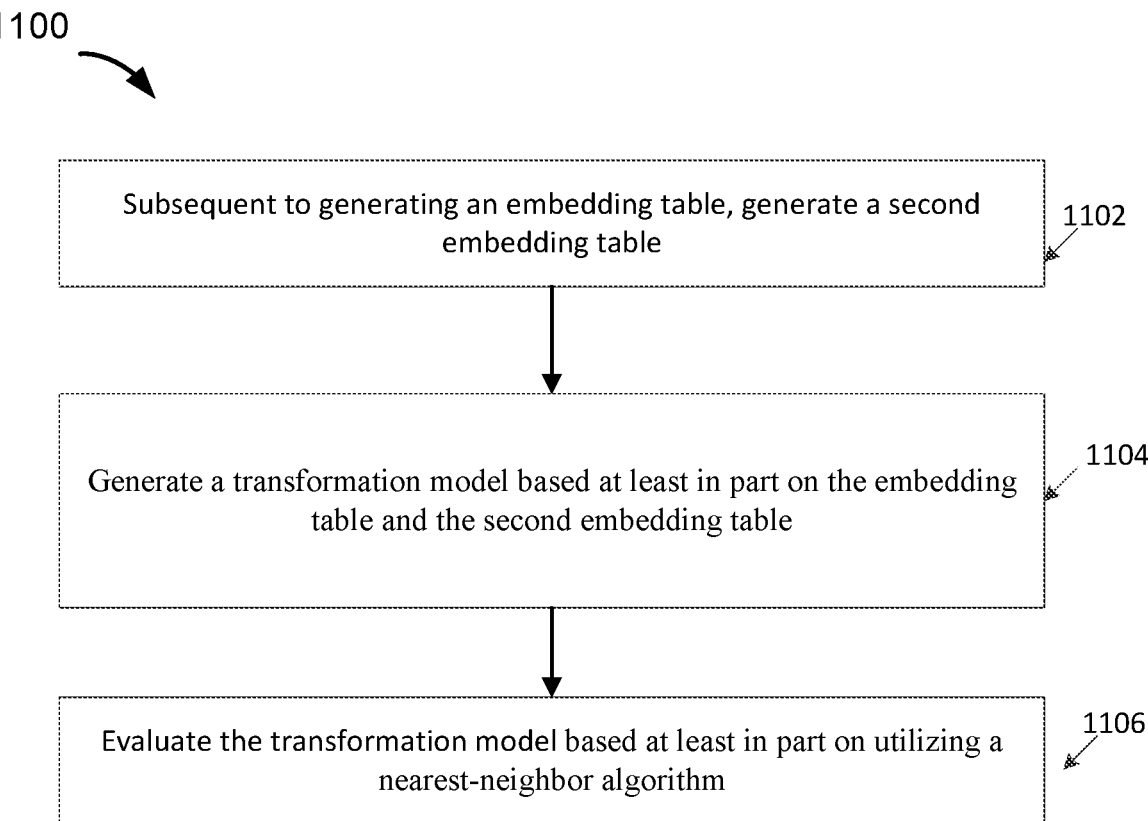
FIG. 11 depicts a flowchart for generating and evaluating a transformation model, according to an embodiment of the invention.

FIGS. 10 and 11, respectively, show flow charts for generating an access score by a previously trained prediction model utilizing a transformed embedding and for generating a transformation model that outputs a transformed embedding. The process 1000 of FIG. 10 may utilize a similar prediction model to that depicted in FIG. 3, and the process 1100 of FIG. 11 used to generate the transformation model may utilize a similar neural network to that described in reference to FIGS. 8 and 9.

1. Method for Generating an Access Score by a Previously Trained Prediction Model Utilizing a Transformed Embedding FIG. 10 depicts a process 1000 for generating an access score by a previously trained prediction model using a transformation model, according to an embodiment of the invention.

At block 1002, the system (e.g., a processing computer) may receive an access request to access a resource by a user device. In some embodiments, the access request may be received subsequent to generation of a previous embedding table with a previous user embedding associated with a user identifier of the user device. The access request may also include a resource provider identifier and the user identifier. The user identifier may be one of a plurality of user identifiers respectively associated with the plurality of user devices.

At block 1004, the system may retrieve from an updated embedding table an updated user embedding associated with the user identifier and including a plurality of dimensions. In some embodiments, the updated user embedding may have been generated similar to as described in reference to FIGS. 4 and 5.

At block 1006, the system may input the updated user embedding into a transformation model of the system. The transformation model may trained similar to as described in reference to FIGS. 8 and 9. For example, the transformation model may have been trained by creating a mapping between embedding vectors of the updated embedding table and embedding vectors of the previous embedding table.

At block 1008, the transformation model may determine (e.g., generate) a transformed user embedding. In some embodiments, the transformed embedding may correspond to a context that incorporates contextual data from both the previous user embedding and the updated user embedding. In another embodiment, for example in the case of a new user, the transformed user embedding may only include contextual data from the updated user embedding, whereby the contextual data is mapped to an old contextual space.

At block 1010, the system may input the transformed user embedding into a machine learning model of the system. In some embodiments, the machine learning model may correspond to the prediction model 300 of FIG. 3. In some embodiments, the machine learning model 300 may have been previously trained using an embedding layer 308 that was generated from the previous embedding table.

At block 1012, the machine learning model may determine (e.g., generate) an access score for determining whether to authorize the user device to access the resource. In some embodiments, this operation may be similar to as described in reference to block 608 of FIG. 6.

2. Method for Generating and Evaluating a Transformation Model

FIG. 11 depicts a process 1100 for generating and evaluating a transformation model, according to an embodiment of the invention. In some embodiments, the transformation model is generated based at least in part on mapping a newly generated embedding table to a previously generated embedding table.

At block 1102, subsequent to generating an embedding table, the system may generate a second embedding table. In some embodiments, the steps for generating each of these embedding tables may be similar to as described in reference to FIGS. 4 and 5.

At block 1104, the system may generate a transformation model based at least in part on the embedding table and the second embedding table. In some embodiments the steps for generating the transformation model may be similar to those described in reference to FIGS. 8 and 9. For example, in one embodiment, the transformation model may include a linear model trained via an MSE loss function. In another embodiment, the transformation model may include a non-linear model which uses a single hidden layer neural network. The neural network may use ReLU as an activation function. The neural network may be trained by minimizing a loss function, which may be expressed as a sum of cosine distances of corresponding embedding vectors between the two tables. Any other suitable variations of transformation models and/or loss functions may be used to perform embodiments of the invention. For instance, in yet another non-limited example, the transformation model may use a MUSE algorithm for generating a transformed embedding. For more information on MUSE, see, for example Conneau, A., et. al., Word translation without parallel data. CoRR abs/ 1710.04087 (2017).

At block 1106, the system may evaluate the transformation model based at least in part on utilizing a nearest neighbor algorithm. In one embodiment, a K-nearest neighbor algorithm may be used as described above. For example, the K-nearest neighbor algorithm may evaluate the model by mapping a test instance x to a target space as y'. The algorithm may then select a point y" in the target space based at least in part on y'. The algorithm may then determine the model's accuracy by calculating the K-nearest neighbor of y" in the target space (e.g., K=1, 5, or 10) according to the cosine distance, and determine whether the ground truth y is inside the nearest neighbors. In some embodiments, the value of K may be predetermined as a threshold error tolerance value. In other embodiments, any suitable method may be used to evaluate the transformation model. Upon completion of the evaluation, depending on whether the determined accuracy matches (e.g., equals, greater than, or less than) a threshold value, one or more models may be re-trained. For example, the prediction model 300 may be retrained with a new embedding layer being generated. In another example, the transformation model may be re-trained with new initialization data.

IV. Utilizing a Transformation Model to Generate an Access Score for Determining Authorization to Building As described above, the embodiments depicted may be implemented in multiple types of environments (e.g., payment processing networks, determining access to a building, determining access to a secure server, etc.). In each of these environments, a predictive model may be utilize embeddings to assess a level of risk (e.g., access score) in authorizing a user device to access a resource.

Figure 12:
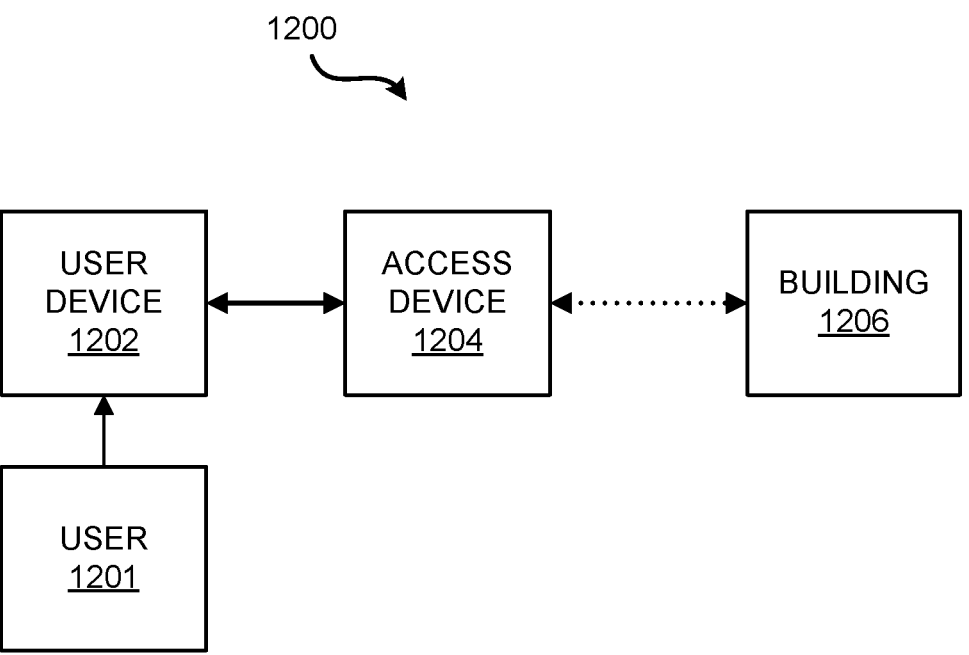
FIG. 12 depicts a block diagram of a system for accessing a resource based at least in part on an access score, according to an embodiment of the invention.

FIG. 12 depicts a block diagram of a system for accessing a building resource based at least in part on an access score, according to an embodiment of the invention. FIG. 12 shows a system 1200 including a user device 1202 (e.g., an employee badge) of a user 1201, an access device 1204 (e.g., a gateway server), and a building 1206. The access device 1204 may be in further communication with other intermediary computers between the access device 920 and the building 1206 (not shown). For example, the access device 1204 may be a card scanner attached to the building 1206, and connected over a network to a processing computer (e.g., similar to processing computer 106 of FIG. 1). The building 1206 may also be connected to the processing computer. In another example, the building 1206 (and/or processing computer) may also be connected to an authorization computer (e.g., similar to the authorization computer 108 of FIG. 1). For example, the authorization computer could be a building access server that controls egress and ingress from the building 1206.

In FIG. 12, the user device 1202 be scanned by the access device 1204, in an attempt by the user 1201 to gain access to the building 1206. Upon being scanned, the access device 1204 may send an access request that contains the user identifier (obtained from the user device 1202) to the processing computer. The processing computer may then determine an access score utilizing one or more of the embodiments described above (e.g., retrieving a user embedding and generating the access score based at least in part on the embedding). Based at least in part on the determined access score, the processing computer may recommend to the building 1206 (e.g., building access server, authorization computer, etc.) to allow or deny access to the building.

In the above description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method performed by a processing computer, the computer-implemented method comprising:

receiving an access request to access a resource by a user device, the access request including a resource provider identifier and a user identifier of a plurality of user identifiers respectively associated with a plurality of user devices;

retrieving, from a first embedding table, a user embedding associated with the user identifier and comprising a plurality of dimensions, wherein each dimension of the plurality of dimensions is associated with a context of the user identifier appearing in previous access requests within temporal proximity to other access requests from a subset of other user devices among the plurality of user devices, wherein the user embedding provides a first multidimensional data point indicating a similarity of the user device to the subset of other user devices in a first dimensional space;

inputting the user embedding into a first machine learning model of the processing computer, wherein the first machine learning model has been trained using the first embedding table; and determining, by the first machine learning model, an access score for determining whether to authorize the user device to access the resource, the access score corresponding to a level of authenticity of authorizing the user device to access the resource, wherein the computer-implemented method further comprises:

generating, by a second machine learning model of the processing computer, a second embedding table comprising a second user embedding associated with the user identifier and comprising a second plurality of dimensions, wherein each dimension of the second plurality of dimensions is associated with a second context of the user identifier appearing in previous access requests within temporal proximity to other access requests from a second subset of other user devices among the plurality of user devices, wherein the second user embedding provides a second multidimensional data point that indicates a second similarity of the user device to the second subset of other user devices in a second dimensional space different from the first dimensional space; and training a transformation model using the first embedding table and the second embedding table, to generate a trained transformation model configured to determine a mapping between embeddings of the first embedding table and embeddings of the second embedding table, wherein, based on the second user embedding input to the transformation model, the trained transformation model is configured to provide a transformed user embedding in the first dimensional space using the mapping, and wherein, based on the transformed user embedding input to the first machine learning model, the first machine learning model determines a second access score for the user identifier to authorize the user device to access a second resource without being retrained on the second embedding table.

2. The computer-implemented method of claim 1, wherein the user identifier is associated with a user account number of a user of the user device.

3. The computer-implemented method of claim 1, wherein the user embedding is one of a plurality of user embeddings within the first embedding table, and the first multidimensional data point corresponds to a vector, each value of the vector associated with a dimension of the plurality of dimensions.

4. The computer-implemented method of claim 3, wherein the similarity of the user device to the subset of other user devices is determined based at least in part on comparing each value within respectively associated vectors.

5. The computer-implemented method of claim 1, wherein the first machine learning model comprises a neural network that is trained based at least in part on utilizing a value corresponding to a dimension of the user embedding as input to determine a weight of a node of the neural network.

6. The computer-implemented method of claim 1, further comprising:

transmitting to an authorization computer an authorization request message including the access score;

receiving an authorization response message including an authorization response, the authorization response based at least in part on the access score; and transmitting the authorization response to an access device associated with a resource provider, the authorization response used to determine whether to authorize the user device to access the resource.

7. The computer-implemented method of claim 1, further comprising:

receiving training data comprising a second plurality of user identifiers that are respectively associated with the subset of other user devices, each user identifier of the second plurality of user identifiers being selected to be included in the training data based at least in part on appearing in at least one of the previous access requests with the resource provider identifier;

inputting the training data into the second machine learning model;

generating, by the second machine learning model, the first embedding table based at least in part on the training data; and training the first machine learning model using the training data and the first embedding table, wherein an authenticity of the previous access requests is known.

8. The computer-implemented method of claim 7, wherein the second machine learning model is trained based at least in part on minimizing a loss function that is configured to determine a difference between a ground truth user identifier and a predicted user identifier.

9. The computer-implemented method of claim 1, wherein the first machine learning model is further trained to generate the access score based at least in part on a resource provider embedding corresponding to the resource provider identifier.

10. The computer-implemented method of claim 1, further comprising:

receiving a second access request to access the second resource by the user device, the second access request including a second resource provider identifier and the user identifier of the plurality of user identifiers respectively associated with the plurality of user devices;

inputting the second user embedding into the transformation model;

determining, by the transformation model, the transformed user embedding;

inputting the transformed user embedding into the first machine learning model; and determining, by the first machine learning model, the second access score for determining whether to authorize the user device to access the second resource.

11. The computer-implemented method of claim 1, wherein the first machine learning model is trained based at least in part on the first embedding table that was generated prior to the second embedding table.

12. The computer-implemented method of claim 10, wherein the transformation model comprises a neural network, and generating the neural network corresponds to generating the mapping between the user embedding and the second user embedding based at least in part on minimizing a loss function.

13. The computer-implemented method of claim 1, wherein the user embedding corresponds to a first vector, each value of the first vector associated with a respective dimension of the plurality of dimensions, and the second user embedding corresponds to a second vector, each value of the second vector associated with a respective dimension of the second plurality of dimensions.

14. The computer-implemented method of claim 13, wherein the plurality of dimensions and the second plurality of dimensions correspond to different contextual spaces.

15. The computer-implemented method of claim 13, wherein a neural network of the transformation model is trained based at least in part on minimizing a loss function that is configured to determine a mean squared error (MSE) between the first vector and the second vector or determine a cosine distance between the first vector and the second vector.

16. The computer-implemented method of claim 15, further comprising:

determining an accuracy of the transformation model based at least in part on determining a K-nearest neighbor utilizing the determined cosine distance.

17. The computer-implemented method of claim 16, wherein the first machine learning model or the second machine learning model is re-trained upon the determined accuracy matching a predetermined threshold value.

18. The computer-implemented method of claim 1, wherein a plurality of sets of training data are used to train the second machine learning model, each set of training data associated with a different resource provider.

19. A processing computer comprising:

a processor; and a computer readable medium that, when executed by the processor, causes the processor to perform a method including:

receiving an access request to access a resource by a user device, the access request including a resource provider identifier and a user identifier of a plurality of user identifiers respectively associated with a plurality of user devices;

retrieving, from a first embedding table, a user embedding associated with the user identifier and comprising a plurality of dimensions, wherein each dimension of the plurality of dimensions is associated with a context of the user identifier appearing in previous access requests within temporal proximity to other access requests from a subset of other user devices among the plurality of user devices, wherein the user embedding provides a first multidimensional data point indicating a similarity of the user device to the subset of other user devices in a first dimensional space;

inputting the user embedding into a first machine learning model of the processing computer, wherein the first machine learning model has been trained using the first embedding table; and determining, by the first machine learning model, an access score for determining whether to authorize the user device to access the resource, the access score corresponding to a level of authenticity of authorizing the user device to access the resource, wherein the method further includes:

generating, by a second machine learning model of the processing computer, a second embedding table comprising a second user embedding associated with the user identifier and comprising a second plurality of dimensions, wherein each dimension of the second plurality of dimensions is associated with a second context of the user identifier appearing in previous access requests within temporal proximity to other access requests from a second subset of other user devices among the plurality of user devices, wherein the second user embedding provides a second multidimensional data point that indicates a second similarity of the user device to the second subset of other user devices in a second dimensional space different from the first dimensional space; and training a transformation model using the first embedding table and the second embedding table, to generate a trained transformation model configured to determine a mapping between embeddings of the first embedding table and embeddings of the second embedding table, wherein, based on the second user embedding input to the transformation model, the trained transformation model is configured to provide a transformed user embedding in the first dimensional space using the mapping, and wherein, based on the transformed user embedding input to the first machine learning model, the first machine learning model a second access score for the user identifier to authorize the user device to access a second resource without being retrained on the second embedding table.

* * * * *